(12) United States Patent
Sakai et al.

(10) Patent No.: US 9,470,427 B2
(45) Date of Patent: Oct. 18, 2016

(54) HUMIDITY CONTROL APPARATUS

(71) Applicant: DAIKIN INDUSTRIES, LTD., Osaka-shi, Osaka (JP)

(72) Inventors: Gakuto Sakai, Osaka (JP); Akihiro Eguchi, Osaka (JP); Tomohiro Yabu, Shiga (JP)

(73) Assignee: Daikin Industries, Ltd., Osaka (JP)

(*) Notice: Subject to any disclaimer, the term of this patent is extended or adjusted under 35 U.S.C. 154(b) by 288 days.

(21) Appl. No.: 14/351,755

(22) PCT Filed: Oct. 16, 2012

(86) PCT No.: PCT/JP2012/006608
§ 371 (c)(1),
(2) Date: Apr. 14, 2014

(87) PCT Pub. No.: WO2013/061539
PCT Pub. Date: May 2, 2013

(65) Prior Publication Data
US 2014/0230480 A1  Aug. 21, 2014

(30) Foreign Application Priority Data

Oct. 27, 2011 (JP) ................. 2011-236146

(51) Int. Cl.
| F25D 23/00 | (2006.01) |
| F24F 3/14 | (2006.01) |
| F24F 12/00 | (2006.01) |
| B01D 53/26 | (2006.01) |
| F25B 13/00 | (2006.01) |

(52) U.S. Cl.
CPC .......... *F24F 3/1429* (2013.01); *B01D 53/265* (2013.01); *F24F 3/1405* (2013.01); *F24F12/003* (2013.01); *F25B 13/00* (2013.01); *F25B 2313/0272* (2013.01); *F25B 2313/02343* (2013.01); *F25B 2313/02741* (2013.01); *Y02B 30/52* (2013.01); *Y02B 30/563* (2013.01)

(58) Field of Classification Search
CPC . F24F 3/1423; F24F 2203/1084; F25B 1/10; F25B 13/00

USPC ................. 62/176.1, 271, 238.7, 238.6, 498
See application file for complete search history.

(56) References Cited

U.S. PATENT DOCUMENTS

| 5,517,828 A * | 5/1996 | Calton ................ F24F 3/1411 62/271 |
| 7,412,836 B2 * | 8/2008 | Ikegami ............... B01D 53/261 62/272 |
| 2007/0039343 A1 * | 2/2007 | Ikegami ............... B01D 53/263 62/271 |

FOREIGN PATENT DOCUMENTS

| JP | 2005-291535 A | 10/2005 |
| JP | 2008-039219 A | 2/2008 |
| JP | 2010-054135 A | 3/2010 |
| JP | 2011-080694 A | 4/2011 |

OTHER PUBLICATIONS

International Search Report issued in PCT/JP2012/006608 dated Jan. 22, 2013.

* cited by examiner

*Primary Examiner* — Melvin Jones
(74) *Attorney, Agent, or Firm* — Birch, Stewart, Kolasch & Birch, LLP

(57) ABSTRACT

A humidity control apparatus performs a humidification operation in which outdoor air is supplied to the inside of a room through a moisture-desorption adsorption heat exchanger serving as a condenser and room air is discharged to the outside through a moisture-absorption adsorption heat exchanger serving as an evaporator. The humidity control apparatus includes a preheat heat exchanger which, in the humidification operation, is positioned upstream of the moisture-desorption adsorption heat exchanger in the flow of outdoor air in an air passage and serves as a condenser to heat outdoor air in a refrigerant circuit, and a heat-recovery heat exchanger which, in the humidification operation, is positioned downstream of the moisture-absorption adsorption heat exchanger in the flow of room air in the air passage and serves as an evaporator to recover heat from room air in the refrigerant circuit.

5 Claims, 9 Drawing Sheets

FIG.2
(A)
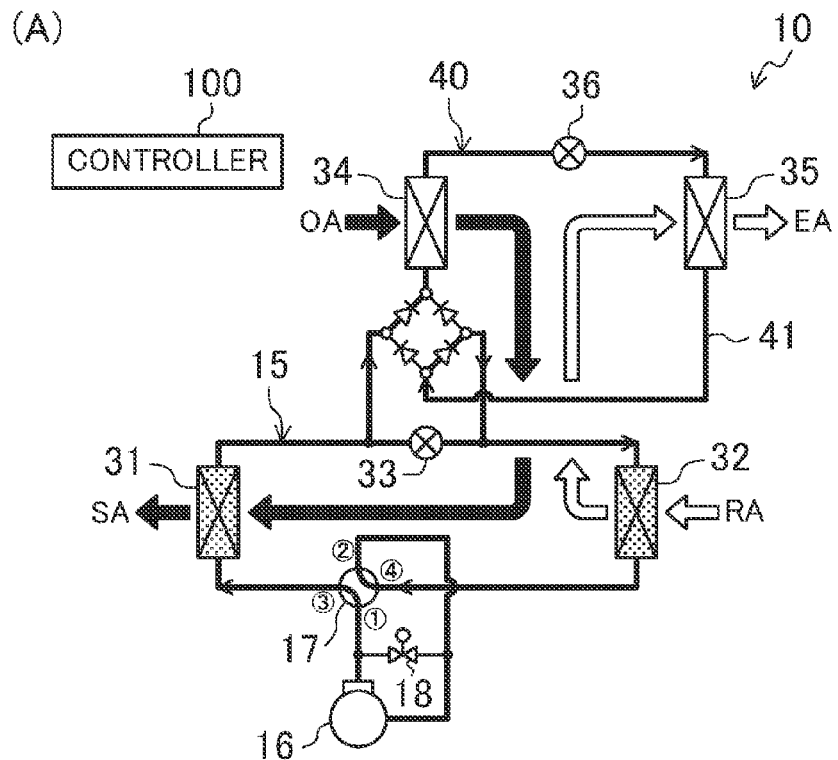
(B)
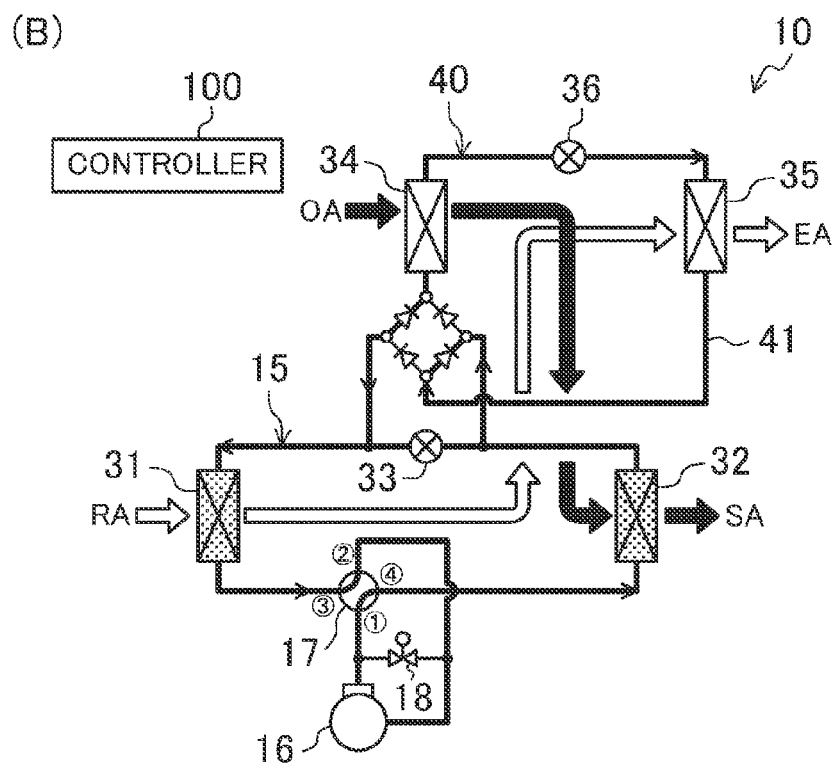

FIG.5
(A)
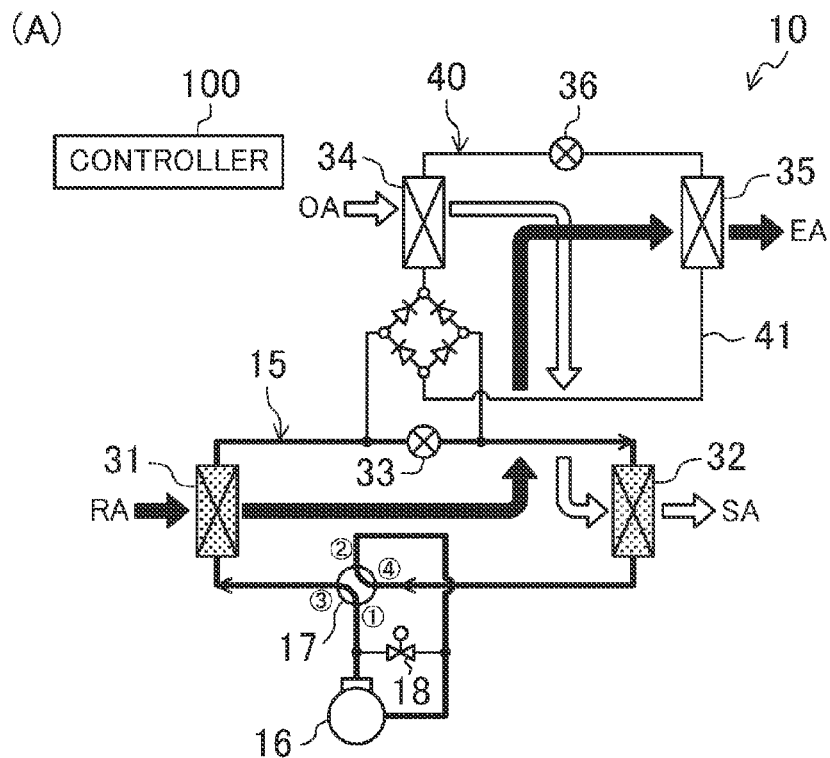
(B)
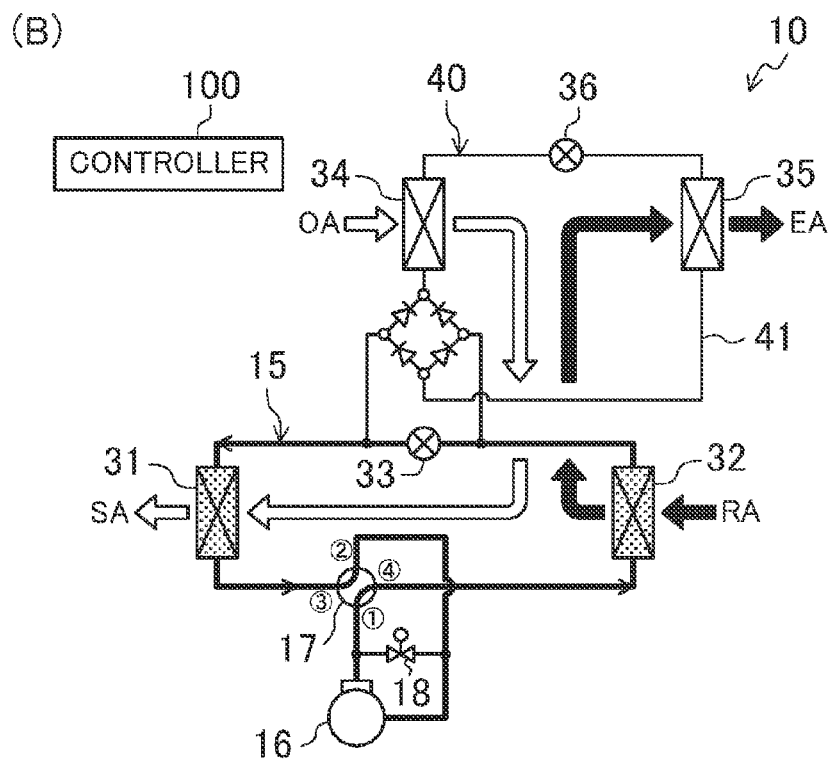

FIG.8
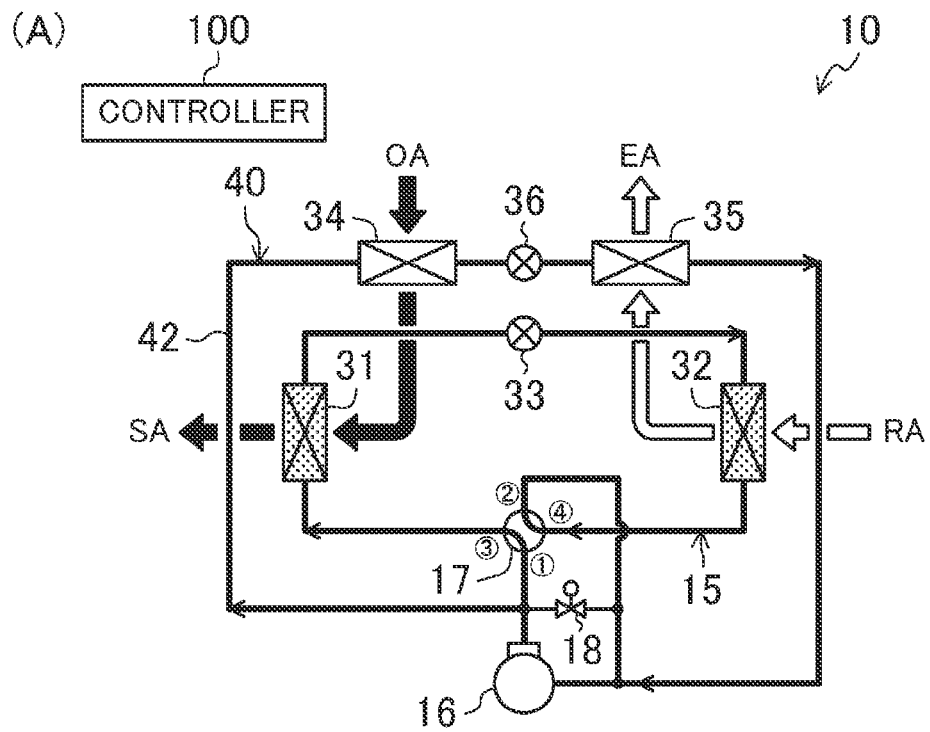
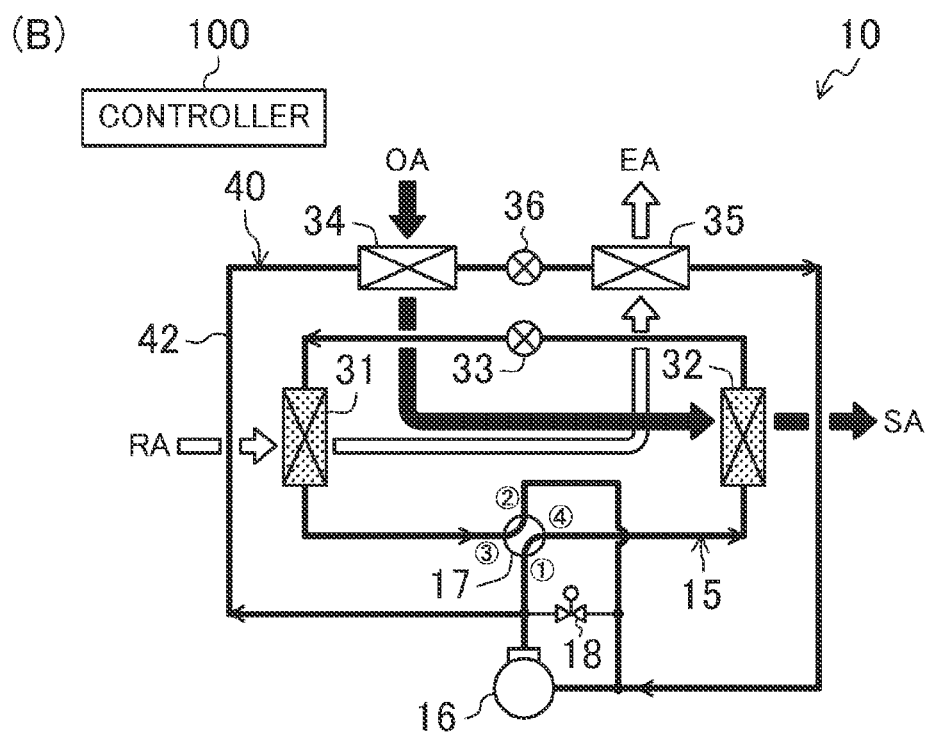

FIG.9
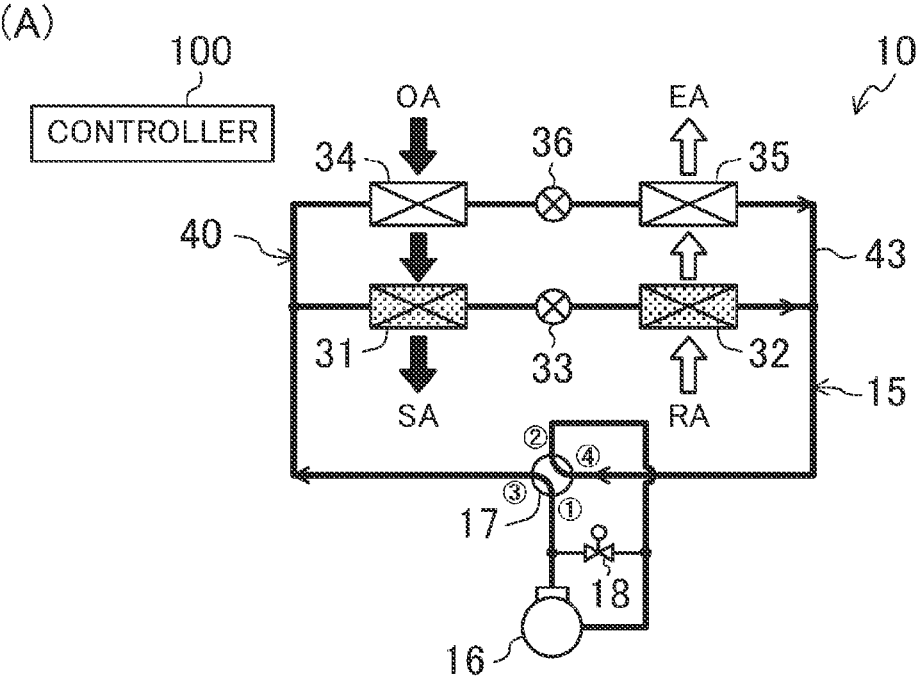
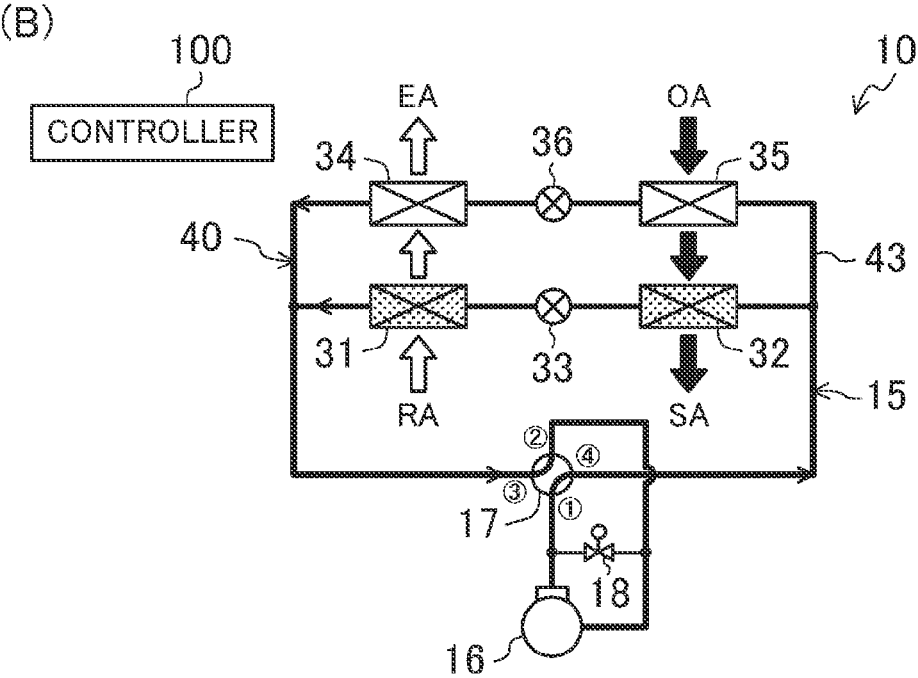

HUMIDITY CONTROL APPARATUS

TECHNICAL FIELD

The present disclosure relates to a humidity control apparatus configured to control room humidity using an adsorbent.

BACKGROUND ART

Conventionally, a humidity control apparatus has been known, which is configured to control room humidity using an adsorbent. Patent Document 1 discloses, as the humidity control apparatus of this type, an apparatus configured to control room humidity using two adsorption heat exchangers on each of which an adsorbent is supported.

The humidity control apparatus includes a refrigerant circuit configured such that a compressor, an expansion mechanism, and the adsorption heat exchangers are connected together and that a refrigerant circulation direction is reversible, and an air passage configured such that an air flow path switches, depending on the refrigerant circulation direction in the refrigerant circuit, so as to cause one of room air or outdoor air to pass through one (i.e., a moisture-desorption adsorption heat exchanger) of the adsorption heat exchangers serving as a condenser and to cause the other one of room air or outdoor air to pass through the other one (i.e., a moisture-absorption adsorption heat exchanger) of the adsorption heat exchangers serving as an evaporator. In the humidity control apparatus, a humidification operation is performed, in which outdoor air is supplied to the inside of a room through the moisture-desorption adsorption heat exchanger and room air is discharged to the outside through the moisture-absorption adsorption heat exchanger.

In theory, in a refrigeration cycle, heat absorbed by refrigerant in an evaporator and a compressor is dissipated from the refrigerant in a condenser. However, since the moisture-absorption adsorption heat exchanger serving as the evaporator in the humidity control apparatus is mainly intended for dehumidification of room air, there is a possibility that a sufficient amount of heat absorbed by refrigerant cannot be ensured. On the other hand, in order to, e.g., recover the adsorbent, a certain amount of heat should be ensured in the moisture-desorption adsorption heat exchanger serving as the condenser. For such reasons, it is necessary to compensate for the lack of the amount of heat absorbed by refrigerant in the moisture-absorption adsorption heat exchanger with heat provided to refrigerant in the compressor. This may increase power consumption in the compressor, resulting in lowering of compressor efficiency.

In the humidity control apparatus of Patent Document 1, an air heat exchanger is connected between each adsorption heat exchanger and the expansion mechanism in the refrigerant circuit. In the humidification operation, one of the air heat exchangers serves as a subcooler configured to subcool refrigerant using outdoor air, and the other air heat exchanger serves as a heat-recovery heat exchanger configured to recover heat from room air. Thus, in the humidification operation, refrigerant can be subcooled in the subcooler, as well as recovering heat from exhaust air not only in the moisture-absorption adsorption heat exchanger but also in the heat-recovery heat exchanger. Accordingly, in the humidification operation, the required amount of heat dissipated to outdoor air can be fully ensured, and it is not necessary to compensate for the lack of the amount of heat absorbed by refrigerant in the moisture-absorption adsorption heat exchanger with heat provided to refrigerant in the compressor. As a result, lowering of compressor efficiency can be reduced.

In the humidity control apparatus, the subcooler in the flow of outdoor air and the heat-recovery heat exchanger in the flow of room air are both arranged downstream or upstream of the adsorption heat exchangers.

CITATION LIST

Patent Document

PATENT DOCUMENT 1: Japanese Unexamined Patent Publication No. 2005-291535

SUMMARY OF THE INVENTION

Technical Problem

The humidification operation is often combined with an air-heating operation during the winter during which an outdoor temperature is low. When the humidification operation is performed under an extremely low outdoor temperature, there is a possibility that moisture desorbed from the absorbent of the moisture-desorption adsorption heat exchanger is, due to a high relative humidity of outdoor air, less likely to be captured by the outdoor air and therefore sufficient humidification in the room cannot be performed. For such reasons, in the humidification operation under a low outdoor temperature, it is preferable that the subcooler is positioned upstream of the moisture-desorption adsorption heat exchanger in the flow of outdoor air and that outdoor air is pre-heated with refrigerant in the subcooler before passing through the moisture-desorption adsorption heat exchanger. Such pre-heating of outdoor air before passage of the outdoor air through the moisture-desorption adsorption heat exchanger allows the outdoor air to capture most of moisture desorbed from the adsorbent of the moisture-desorption adsorption heat exchanger. Thus, sufficient humidification in the room can be performed.

However, in the humidity control apparatus, when the subcooler is positioned upstream of the moisture-desorption adsorption heat exchanger in the flow of outdoor air as described above, the heat-recovery heat exchanger is also positioned upstream of the moisture-absorption adsorption heat exchanger in the flow of room air. In the case where the heat-recovery heat exchanger is positioned upstream of the moisture-absorption adsorption heat exchanger, condensation of a large amount of moisture contained in room air occurs when the room air passes through the heat-recovery heat exchanger, and a sufficient amount of the moisture of the room air cannot be recovered by the adsorbent of the moisture-absorption adsorption heat exchanger. As a result, there is a possibility that sufficient humidification in the room cannot be performed.

On the other hand, in the humidity control apparatus, when the heat-recovery heat exchanger is positioned downstream of the moisture-absorption adsorption heat exchanger in the flow of room air, the subcooler is also positioned downstream of the moisture-desorption adsorption heat exchanger in the flow of outdoor air. Thus, outdoor air cannot be heated in the subcooler before passing through the moisture-desorption adsorption heat exchanger. As a result, there is a possibility that sufficient humidification in the room cannot be performed.

The present disclosure has been made in view of the foregoing, and aims to provide a humidity control apparatus capable of performing sufficient humidification in a room even under a low outdoor temperature.

Solution To the Problem

A first aspect of the invention is intended for a humidity control apparatus including a refrigerant circuit (15) configured such that a compressor (16), an expansion mechanism (33), and two adsorption heat exchangers (31, 32) on each of which an adsorbent is supported are connected together through a pipe, a refrigerant circulation direction is reversible, and a vapor compression refrigeration cycle is performed, and an air passage configured such that an air flow path switches, depending on the refrigerant circulation direction in the refrigerant circuit (15), so as to cause one of room air or outdoor air taken into the air passage to pass through one of the adsorption heat exchangers (31, 32) serving as a moisture-desorption adsorption heat exchanger functioning as a condenser and cause the other one of the room air or the outdoor air to pass through the other one of the adsorption heat exchangers (31, 32) serving as a moisture-absorption adsorption heat exchanger functioning as an evaporator. In the humidity control apparatus, a humidification operation is performed, in which the outdoor air is supplied to an inside of a room through the moisture-desorption adsorption heat exchanger, and the room air is discharged to an outside through the moisture-absorption adsorption heat exchanger. The humidity control apparatus includes a preheat heat exchanger (34, 35) connected to the refrigerant circuit (15) and, in the humidification operation, positioned upstream of the moisture-desorption adsorption heat exchanger in a flow of the outdoor air in the air passage and serving as a condenser to heat the outdoor air; and a heat-recovery heat exchanger (35, 34) connected to the refrigerant circuit (15) and, in the humidification operation, positioned downstream of the moisture-absorption adsorption heat exchanger in a flow of the room air in the air passage and serving as an evaporator to recover heat from the room air.

In the first aspect of the invention, in the humidification operation, outdoor air taken in the humidity control apparatus is supplied to the inside of the room after passing through the preheat heat exchanger (34, 35) serving as the condenser and the moisture-desorption adsorption heat exchanger serving as the condenser in this order. Specifically, when passing through the preheat heat exchanger (34, 35), outdoor air first exchanges heat with refrigerant, i.e., absorbs the heat from the refrigerant. Accordingly, the relative humidity of the outdoor air decreases. Then, the outdoor air passes through the moisture-desorption adsorption heat exchanger. At this point, in the moisture-desorption adsorption heat exchanger, moisture desorbs from the adsorbent heated with refrigerant, and is provided to the outdoor air. Since the outdoor air passing through the moisture-desorption adsorption heat exchanger is, as described above, pre-heated in the preheat heat exchanger (34, 35) such that the relative humidity thereof decreases, the outdoor air easily captures the moisture desorbed from the adsorbent of the moisture-desorption adsorption heat exchanger, and therefore most of the desorbed moisture is contained in the outdoor air. Thus, the outdoor air to which sufficient moisture is provided in the moisture-desorption adsorption heat exchanger is supplied to the inside of the room, thereby sufficiently humidifying the inside of the room.

On the other hand, in the humidification operation, room air taken into the humidity control apparatus is discharged to the outside after passing through the moisture-absorption adsorption heat exchanger serving as the evaporator and the heat-recovery heat exchanger (35, 34) serving as the evaporator in this order. Specifically, room air first passes through the moisture-absorption adsorption heat exchanger. At this point, moisture contained in the room air adsorbs to the adsorbent, and therefore the room air is dehumidified. Adsorption heat generated thereupon is absorbed by refrigerant. When passing through the heat-recovery heat exchanger (35, 34), the room air whose moisture is taken by the moisture-absorption adsorption heat exchanger exchanges heat with refrigerant, i.e., dissipates the heat to the refrigerant. Then, the room air is discharged to the outside.

A second aspect of the invention is intended for the humidity control apparatus of the first aspect of the invention, in which, in the refrigerant circuit (15), an auxiliary circuit (40) is provided, in which the preheat heat exchanger (34, 35), an expansion valve (36), and the heat-recovery heat exchanger (35, 34) are connected together in series in this order.

In the second aspect of the invention, when the expansion valve (36) of the auxiliary circuit (40) is closed or is fastened to the minimum opening degree, the flow of refrigerant into the preheat heat exchanger (34, 35) and the heat-recovery heat exchanger (35, 34) is blocked, or only a slight amount of refrigerant flows into the preheat heat exchanger (34, 35) and the heat-recovery heat exchanger (35, 34).

A third aspect of the invention is intended for the humidity control apparatus of the second aspect of the invention, in which the auxiliary circuit (40) includes a one-way flow path (41, 42) through which refrigerant flows in one direction even if the refrigerant circulation direction in the refrigerant circuit (15) is reversed, and the preheat heat exchanger (34), the expansion valve (36), and the heat-recovery heat exchanger (35) are provided in the one-way flow path (41, 42).

In the third aspect of the invention, the preheat heat exchanger (34), the expansion valve (36), and the heat-recovery heat exchanger (35) are provided in the one-way flow path (41, 42) through which refrigerant flows in one direction even if the refrigerant circulation direction in the refrigerant circuit (15) is reversed. Thus, even if the refrigerant circulation direction changes, each air heat exchanger does not switch between the preheat heat exchanger (34) and the heat-recovery heat exchanger (35) depending on the change in refrigerant circulation direction in the refrigerant circuit (15). As a result, one of the air heat exchangers constantly serves as the preheat heat exchanger (34), and the other air heat exchanger constantly serves as the heat-recovery heat exchanger (35).

A fourth aspect of the invention is intended for the humidity control apparatus of the third aspect of the invention, in which the auxiliary circuit (40) is a bridge circuit including the one-way flow path (41).

In the fourth aspect of the invention, the auxiliary circuit (40) is the bridge circuit including the one-way flow path (41) in which the preheat heat exchanger (34), the expansion valve (36), and the heat-recovery heat exchanger (35) are connected together in series in this order.

A fifth aspect of the invention is intended for the humidity control apparatus of the fourth aspect of the invention, in which a dehumidification operation is performed, in which the outdoor air is supplied to the inside of the room through the moisture-absorption adsorption heat exchanger, and the room air is discharged to the outside through the moisture-desorption adsorption heat exchanger, and a control section (100) is provided, which is configured to open the expansion valve (36) to a predetermined minimum opening degree in the dehumidification operation.

In the dehumidification operation, it is not necessary that refrigerant flows through the preheat heat exchanger (34) and the heat-recovery heat exchanger (35). However, if the expansion valve (36) is closed to completely block the flow of refrigerant, there is a possibility that refrigerant is accumulated in the preheat heat exchanger (34), resulting in a decrease in amount of refrigerant circulating in the refrigerant circuit (15).

Thus, in the fifth aspect of the invention, the expansion valve (36) is, as described above, opened to the predetermined minimum opening degree in the dehumidification operation. Thus, the flow of a slight amount of refrigerant in the auxiliary circuit (40) is ensured.

Advantages of the Invention

According to the first aspect of the invention, during the humidification operation, after outdoor air is heated with refrigerant in the preheat heat exchanger (34, 35), the outdoor air passes through the moisture-desorption adsorption heat exchanger in the humidity control apparatus. Thus, even under a low outdoor temperature, most of moisture desorbed from the adsorbent of the moisture-desorption adsorption heat exchanger can be captured by the outdoor air. Consequently, the inside of the room can be sufficiently humidified. Moreover, during the humidification operation, after room air is dehumidified in the moisture-absorption adsorption heat exchanger, the room air passes through the heat-recovery heat exchanger (35, 34) in the humidity control apparatus. Thus, condensation of moisture contained in the room air does not occur in the heat-recovery heat exchanger (35, 34). In addition, a sufficient amount of the moisture contained in the room air can be recovered in the moisture-absorption adsorption heat exchanger, and sufficient heat can be recovered from the room air by refrigerant. According to such a configuration, even under a low outdoor temperature, the inside of the room can be sufficiently humidified.

The humidification operation is often combined with an air-heating operation during the winter. When the humidification operation is performed under an extremely low outdoor temperature, there is a possibility that the temperature of humidified outdoor air to be supplied to the inside of the room reaches lower than a room temperature, resulting in an increase in air-heating load inside the room.

However, in the first aspect of the invention, outdoor air can be heated to a certain level in the preheat heat exchanger (34, 35). Moreover, in the first aspect of the invention, refrigerant recovers heat from room air not only in the moisture-absorption adsorption heat exchanger serving as the evaporator but also in the heat-recovery heat exchanger (35, 34) serving as the evaporator. Thus, the amount of heat dissipated from refrigerant increases in the moisture-desorption adsorption heat exchanger and the preheat heat exchanger (34, 35) serving as the condensers. According to the first aspect of the invention, even in the humidification operation under a low outdoor temperature, a sufficient amount of heat dissipated from refrigerant to outdoor air can be ensured, and therefore an increase in air-heating load inside the room can be reduced.

According to the second aspect of the invention, in the case where pre-heating of outdoor air in the preheat heat exchanger (34, 35) and recovery of heat from room air to refrigerant in the heat-recovery heat exchanger (35, 34) are not required, the expansion valve (36) of the auxiliary circuit (40) is closed or is fastened to the minimum opening degree, thereby reducing or preventing unnecessary pressure loss in the preheat heat exchanger (34, 35) and the heat-recovery heat exchanger (35, 34). Accordingly, lowering of refrigeration cycle efficiency can be reduced.

According to the third aspect of the invention, even if the refrigerant circulation direction is reversed, refrigerant flows in one direction in the one-way flow path (41, 42). This brings about, without switching of each air heat exchanger between the preheat heat exchanger (34, 35) and the heat-recovery heat exchanger (35, 34), the state in which one of the air heat exchangers constantly serves as the preheat heat exchanger (34) and the other air heat exchanger constantly serves as the heat-recovery heat exchanger (35). If each air heat exchanger switches between the preheat heat exchanger (34) and the heat-recovery heat exchanger (35), thermal capacity loss occurs. However, the foregoing configuration can reduce or prevent occurrence of such thermal capacity loss.

According to the fourth aspect of the invention, the auxiliary circuit (40) including the one-way passage (41) through which refrigerant flows in one direction even if the refrigerant circulation direction in the refrigerant circuit (15) is reversed can be easily formed.

According to the fifth aspect of the invention, in the dehumidification operation, the expansion valve (36) of the auxiliary circuit (40) is opened to the predetermined minimum opening degree to ensure the flow of a slight amount of refrigerant in the auxiliary circuit (40). Thus, accumulation of refrigerant in the preheat heat exchanger (34) can be reduced. Consequently, lowering of refrigeration cycle efficiency due to a decrease in amount of refrigerant circulating in the refrigerant circuit (15) can be reduced.

BRIEF DESCRIPTION OF THE DRAWINGS

FIGS. 2(A) and 2(B) are refrigerant circuit diagrams illustrating the schematic configuration of a refrigerant circuit and modes of a humidification operation in the first embodiment.

FIGS. 5(A) and 5(B) are refrigerant circuit diagrams illustrating the schematic configuration of the refrigerant circuit and modes of a dehumidification operation in the first embodiment.

FIGS. 8(A) and 8(B) are refrigerant circuit diagrams illustrating the schematic configuration of a refrigerant circuit and modes of a humidification operation in a second embodiment.

FIGS. 9(A) and 9(B) are refrigerant circuit diagrams illustrating the schematic configuration of a refrigerant circuit and modes of a humidification operation in a third embodiment.

DESCRIPTION OF EMBODIMENTS

Embodiments of the present disclosure will be described below in detail with reference to drawings.

<<First Embodiment of the Invention>>

A humidity control apparatus (10) of a first embodiment is configured to supply dehumidified air or humidified air to the inside of a room.

<Entire Configuration of Humidity Control Apparatus>

The configuration of the humidity control apparatus (10) will be described with reference to FIG. 1. Note that "upper," "lower," "left," "right," "front," "rear," "near," and "far" used in the description below mean "upper," "lower," "left," "right," "front," "rear," "near," and "far" when the humidity control apparatus (10) of the present embodiment is viewed from the front, respectively.

Figure 1:
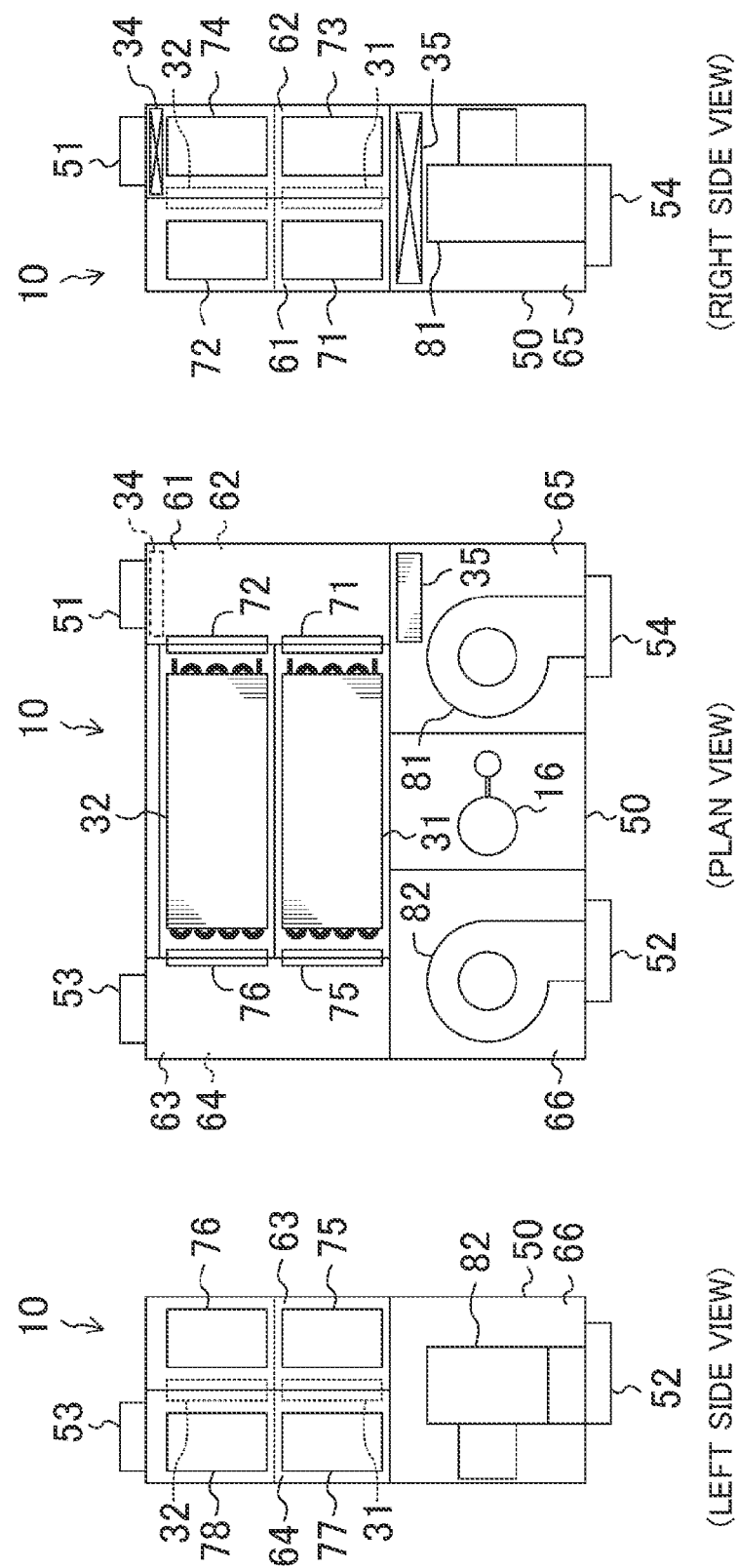
FIG. 1 is a schematic view illustrating the configuration of a humidity control apparatus of a first embodiment.

Referring to FIG. 1, the humidity control apparatus (10) of the present embodiment includes a casing (50). In the casing (50), a refrigerant circuit (15) is housed. A first adsorption heat exchanger (31), a second adsorption heat exchanger (32), a first auxiliary heat exchanger (34), a second auxiliary heat exchanger (35), a compressor (16), etc. are provided in the refrigerant circuit (15). The refrigerant circuit (15) will be described in detail later.

The casing (50) is formed in a low-height flat rectangular parallelepiped shape. An air exhaust port (54) is formed close to the right at a front surface of the casing (50), and an air supply port (52) is formed close to the left at the front surface of the casing (50). An outdoor air suction port (51) is formed close to the right at a rear surface of the casing (50), and a room air suction port (53) is formed close to the left at the rear surface of the casing (50).

An internal space of the casing (50) is divided into a front space and a rear space. The front space of the casing (50) is further divided into three spaces arranged in a right-left direction. Of these spaces, the right space serves as an exhaust-side flow path (65), and the left space serves as a supply-side flow path (66). The compressor (16) is housed in the middle space of the front space of the casing (50). An air supply fan (82) is housed in the supply-side flow path (66), and the supply-side flow path (66) communicates with the inside of the room through the air supply port (52). An air exhaust fan (81) is housed in the exhaust-side flow path (65), and the exhaust-side flow path (65) communicates with the outside through the air exhaust port (54). The second auxiliary heat exchanger (35) stands in the exhaust-side flow path (65). Air flowing into the exhaust-side flow path (65) is sucked into the air exhaust fan (81) through the second auxiliary heat exchanger (35).

The rear space of the casing (50) is also divided into three spaces arranged in the right-left direction. The right space of the rear space of the casing (50) is further divided into two spaces arranged in an upper-lower direction. Of these spaces, the upper space serves as an upper right flow path (61), and the lower space serves as a lower right flow path (62). The upper right flow path (61) communicates with the exhaust-side flow path (65). The lower right flow path (62) communicates with the outside through the outdoor air suction port (51). The first auxiliary heat exchanger (34) stands in the lower right flow path (62). Air flowing into the lower right flow path (62) first passes through the first auxiliary heat exchanger (34). On the other hand, the left space of the rear space of the casing (50) is further divided into two spaces arranged in the upper-lower direction. Of these spaces, the upper space serves as an upper left flow path (63), and the lower space serves as a lower left flow path (64). The upper left flow path (63) communicates with the supply-side flow path (66). The lower left flow path (64) communicates with the inside of the room through the room air suction port (53).

Of the spaces of the rear space of the casing (50) arranged in the right-left direction, the middle space is further divided into two spaces arranged in a front-rear direction. Of these spaces arranged in the front-rear direction, the front space houses the first adsorption heat exchanger (31), and the rear space houses the second adsorption heat exchanger (32). Each of the first and second adsorption heat exchangers (31, 32) is in a substantially horizontal attitude so as to divide the housing space thereof into two spaces arranged in the upper-lower direction.

Four openable dampers (71-74, 75-78) are provided in each of two partitions vertically dividing the rear space of the casing (50).

In an upper part of the right partition, the first upper right damper (71) and the second upper right damper (72) are provided side by side with each other. In a lower part of the right partition, the first lower right damper (73) and the second lower right damper (74) are provided side by side with each other. When the first upper right damper (71) opens, the upper right flow path (61) comes into communication with the space above the first adsorption heat exchanger (31). When the second upper right damper (72) opens, the upper right flow path (61) comes into communication with the space above the second adsorption heat exchanger (32). When the first lower right damper (73) opens, the lower right flow path (62) comes into communication with the space below the first adsorption heat exchanger (31). When the second lower right damper (74) opens, the lower right flow path (62) comes into communication with the space below the second adsorption heat exchanger (32).

In an upper part of the left partition, the first upper left damper (75) and the second upper left damper (76) are provided side by side with each other. In a lower part of the left partition, the first lower left damper (77) and the second lower left damper (78) are provided side by side with each other. When the first upper left damper (75) opens, the upper left flow path (63) comes into communication with the space above the first adsorption heat exchanger (31). When the second upper left damper (76) opens, the upper left flow path (63) comes into communication with the space above the second adsorption heat exchanger (32). When the first lower left damper (77) opens, the lower left flow path (64) comes into communication with the space below the first adsorption heat exchanger (31). When the second lower left damper (78) opens, the lower left flow path (64) comes into communication with the space below the second adsorption heat exchanger (32).

As just described, the upper right flow path (61), the lower right flow path (62), the upper left flow path (63), the lower left flow path (64), the exhaust-side flow path (65), and the supply-side flow path (66) are formed in the casing (50). These flow paths (61-66), the space housing the first adsorption heat exchanger (31), and the space housing the second adsorption heat exchanger (32) form an air passage configured such that an air flow path is switchable.

<Configuration of Refrigerant Circuit>

Referring to FIGS. 2(A) and 2(B), the refrigerant circuit (15) includes the compressor (16), the first adsorption heat exchanger (31), the second adsorption heat exchanger (32), an electric expansion valve (33), and a four-way valve (17). An auxiliary circuit (40) is connected to the refrigerant circuit (15) in parallel with the electric expansion valve (33).

In the refrigerant circuit (15), a discharge side of the compressor (16) is connected to a first port of the four-way valve (17), and a suction side of the compressor (16) is connected to a second port of the four-way valve (17). Moreover, the first adsorption heat exchanger (31), the electric expansion valve (33), and the second adsorption heat exchanger (32) are connected together in series in this order from a third port to a fourth port of the four-way valve (17) in the refrigerant circuit (15). Further, a communication path in which an on-off valve (18) is provided connects between the discharge side and the suction side of the compressor (16).

The auxiliary circuit (40) is a bridge circuit including a one-way passage (41) serving as a one-way flow path of the present disclosure. In the bridge circuit, four pipe lines each provided with a check valve are connected together in a bridge-like manner. Of four connection parts of the pipe lines, a pair of connection parts opposing each other are connected to the refrigerant circuit (15), and the other pair of connection parts are connected respectively to ends of the one-way passage (41). According to such a configuration, even if the four-way valve (17) switches to change a refrigerant circulation direction in the refrigerant circuit (15), refrigerant flows through the one-way passage (41) in one direction. The first auxiliary heat exchanger (34), an electric expansion valve (36), and the second auxiliary heat exchanger (35) are connected together in series in this order from an upstream side to a downstream side in the one-way passage (41).

The first adsorption heat exchanger (31), the second adsorption heat exchanger (32), the first auxiliary heat exchanger (34), and the second auxiliary heat exchanger (35) are cross-fin type fin-and-tube heat exchangers each including a heat transfer pipe and a plurality of fins. In each of the first and second adsorption heat exchangers (31, 32), an adsorbent is supported on a surface of each fin. In each of the first and second adsorption heat exchangers (31, 32), air passing between adjacent ones of the fins contacts the adsorbent provided on the fin surface. Note that, e.g., zeolite or silica gel is used as the adsorbent. On the other hand, no adsorbent is supported on surfaces of the first and second auxiliary heat exchangers (34, 35), and the first and second auxiliary heat exchangers (34, 35) serve as air heat exchangers.

The four-way valve (17) switches between a first state (see the state illustrated in FIG. 2(A)) in which the first and third ports communicate with each other and the second and fourth ports communicate with each other, and a second state (see the state illustrated in FIG. 2(B)) in which the first and fourth ports communicate with each other and the second and third ports communicate with each other.

The humidity control apparatus (10) further includes a controller (100) configured to control operation of each component (e.g., the compressor, the electric expansion valve, the four-way valve, and the fan) forming the refrigerant circuit (15) and the auxiliary circuit (40).

Operation

The humidity control apparatus (10) of the present embodiment performs a humidification operation and a dehumidification operation.

<Humidification Operation>

During the humidification operation, in the humidity control apparatus (10), the controller (100) operates the air supply fan (82) and the air exhaust fan (81). When the air supply fan (82) is operated, outdoor air is taken into the casing (50) through the outdoor air suction port (51). When the air exhaust fan (81) is operated, room air is taken into the casing (50) through the room air suction port (53). Moreover, during the humidification operation, the humidity control apparatus (10) alternately repeats first and second modes.

The first mode of the humidification operation will be described. In the first mode, recovery in the first adsorption heat exchanger (31) and adsorption in the second adsorption heat exchanger (32) are performed.

During the first mode, in the refrigerant circuit (15), the controller (100) sets, referring to FIG. 2(A), the four-way valve (17) to the first state, and the opening degree of the electric expansion valve (33) and the opening degree of the electric expansion valve (36) are properly adjusted. In the refrigerant circuit (15), refrigerant discharged from the compressor (16) flows into the first adsorption heat exchanger (31), and then is condensed by dissipating heat to outdoor air in the first adsorption heat exchanger (31). Part of the condensed refrigerant flows into the auxiliary circuit (40) connected in parallel with the electric expansion valve (33). The remaining refrigerant flows into the electric expansion valve (33), and the pressure of such refrigerant is reduced in the electric expansion valve (33).

As described above, the auxiliary circuit (40) is the bridge circuit. Thus, the refrigerant flowing into the auxiliary circuit (40) constantly flows in one direction in the one-way passage (41) of the bride circuit. Specifically, the refrigerant flowing into the first auxiliary heat exchanger (34) is condensed by dissipating heat to outdoor air, and the pressure of the refrigerant is reduced when such refrigerant passes through the electric expansion valve (36). The depressurized refrigerant flows into the second auxiliary heat exchanger (35), and then is evaporated by absorbing heat from room air. The evaporated refrigerant joins, in the refrigerant circuit (15), the refrigerant whose pressure is reduced in the electric expansion valve (33).

After joining of the refrigerant, the refrigerant flows into the second adsorption heat exchanger (32), and then is evaporated by absorbing heat from room air. The evaporated refrigerant is sucked into the compressor (16), and then is compressed.

During the first mode, in the refrigerant circuit (15), the first adsorption heat exchanger (31) and the first auxiliary heat exchanger (34) serve as condensers, and the second adsorption heat exchanger (32) and the second auxiliary heat exchanger (35) serve as evaporators.

Figure 3:
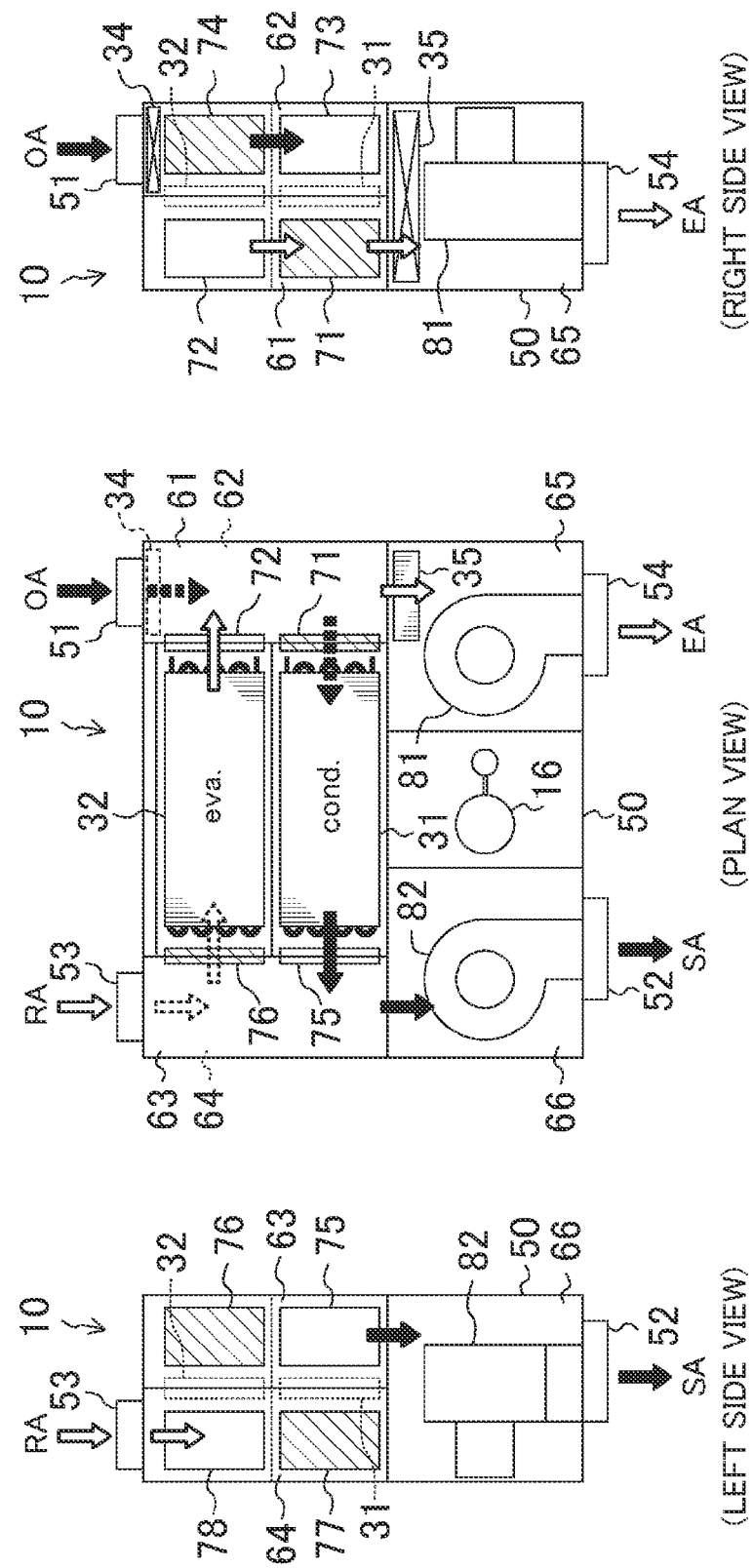
FIG. 3 is a schematic view illustrating the configuration of the humidity control apparatus in the first mode of the humidification operation in the first embodiment.

Referring to FIG. 3, in the first mode, the first lower right damper (73) and the second upper right damper (72) are opened, and the first upper right damper (71) and the second lower right damper (74) are closed. Moreover, the first upper left damper (75) and the second lower left damper (78) are opened, and the first lower left damper (77) and the second upper left damper (76) are closed.

Room air flowing into the lower left flow path (64) through the room air suction port (53) flows into the space below the second adsorption heat exchanger (32) through the second lower left damper (78), and then upwardly passes through the second adsorption heat exchanger (32). In the second adsorption heat exchanger (32), moisture contained in the room air adsorbs to the adsorbent, and the room air is dehumidified. Adsorption heat generated thereupon is absorbed by refrigerant. The room air whose moisture is taken by the second adsorption heat exchanger (32) flows into the upper right flow path (61) through the second upper right damper (72), and then flows into the exhaust-side flow path (65). When passing through the second auxiliary heat exchanger (35), the room air flowing into the exhaust-side flow path (65) exchanges heat with refrigerant, i.e., dissipates heat to the refrigerant. Then, the room air is discharged to the outside through the air exhaust port (54).

When passing through the first auxiliary heat exchanger (34), outdoor air flowing into the lower right flow path (62) through the outdoor air suction port (51) exchanges heat with refrigerant, i.e., absorbs heat from the refrigerant, and the temperature of the outdoor air increases accordingly. The outdoor air whose temperature have increased flows into the space below the first adsorption heat exchanger (31) through the first lower right damper (73), and then upwardly passes through the first adsorption heat exchanger (31). In the first adsorption heat exchanger (31), moisture desorbs from the adsorbent heated with refrigerant, and is provided to the outdoor air. The outdoor air humidified in the first adsorption heat exchanger (31) flows into the upper left flow path (63) through the first upper left damper (75). After passing through the supply-side flow path (66), the outdoor air is supplied to the inside of the room through the air supply port (52).

The second mode of the humidification operation will be described. In the second mode, adsorption in the first adsorption heat exchanger (31) and recovery in the second adsorption heat exchanger (32) are performed.

During the second mode, in the refrigerant circuit (15), the controller (100) sets, referring to FIG. 2(B), the four-way valve (17) to the second state, and the opening degree of the electric expansion valve (33) and the opening degree of the electric expansion valve (36) are properly adjusted. In the refrigerant circuit (15), refrigerant discharged from the compressor (16) flows into the second adsorption heat exchanger (32), and then is condensed by dissipating heat to outdoor air in the second adsorption heat exchanger (32). Part of the condensed refrigerant flows into the auxiliary circuit (40) connected in parallel with the electric expansion valve (33). The remaining refrigerant flows into the electric expansion valve (33), and the pressure of such refrigerant is reduced in the electric expansion valve (33).

As described above, the auxiliary circuit (40) is the bridge circuit. Thus, the refrigerant flowing into the auxiliary circuit (40) constantly flows in one direction in the one-way passage (41) of the bride circuit. Specifically, the refrigerant flowing into the first auxiliary heat exchanger (34) is condensed by dissipating heat to outdoor air, and the pressure of the refrigerant is reduced when such refrigerant passes through the electric expansion valve (36). The depressurized refrigerant flows into the second auxiliary heat exchanger (35), and then is evaporated by absorbing heat from room air. The evaporated refrigerant joins, in the refrigerant circuit (15), the refrigerant whose pressure is reduced in the electric expansion valve (33).

After joining of the refrigerant, the refrigerant flows into the first adsorption heat exchanger (31), and then is evaporated by absorbing heat from room air. The evaporated refrigerant is sucked into the compressor (16), and then is compressed.

During the second mode, in the refrigerant circuit (15), the second adsorption heat exchanger (32) and the first auxiliary heat exchanger (34) serve as condensers, and the first adsorption heat exchanger (31) and the second auxiliary heat exchanger (35) serve as evaporators.

Figure 4:
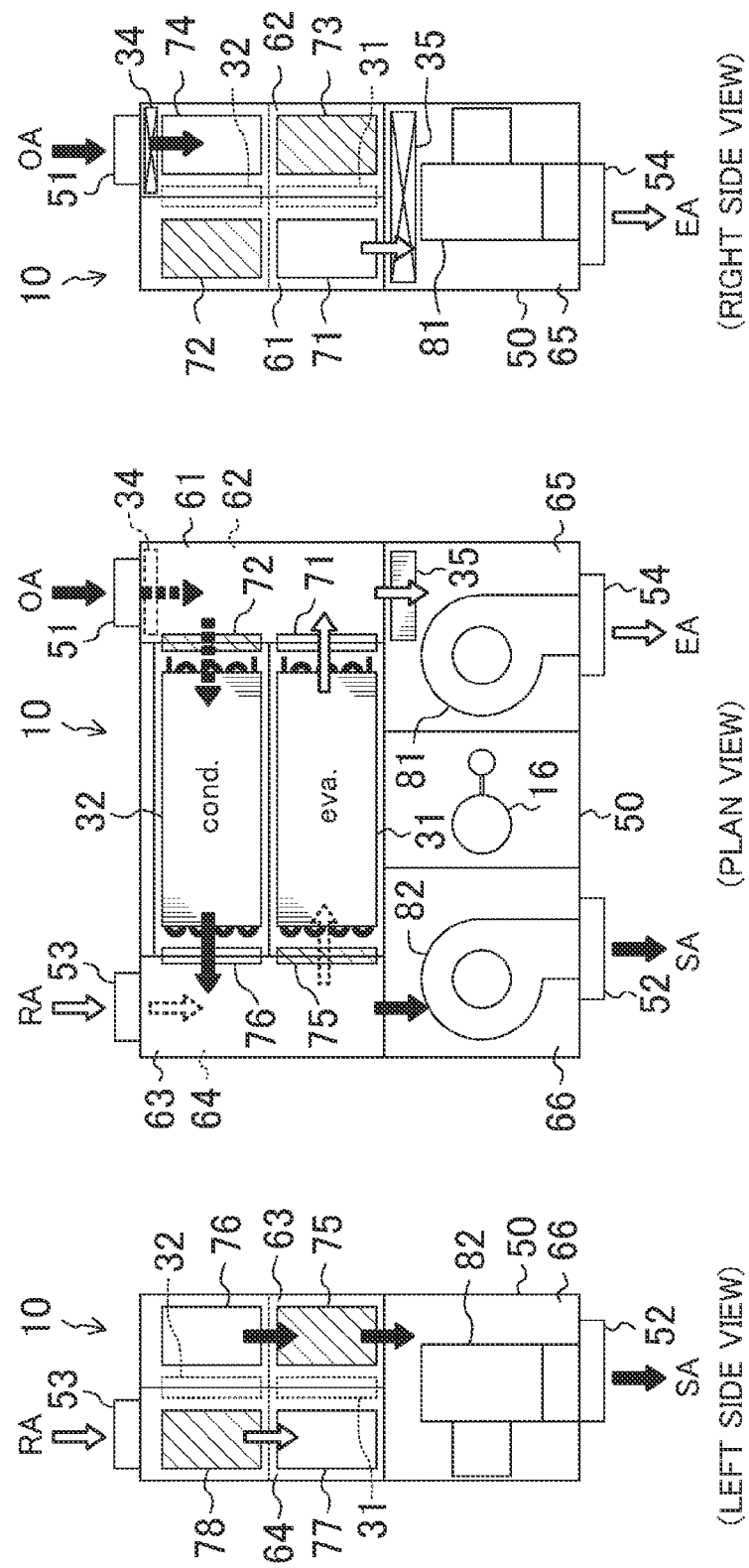
FIG. 4 is a schematic view illustrating the configuration of the humidity control apparatus in the second mode of the humidification operation in the first embodiment.

Referring to FIG. 4, in the second mode, the first upper right damper (71) and the second lower right damper (74) are opened, and the first lower right damper (73) and the second upper right damper (72) are closed. Moreover, the first lower left damper (77) and the second upper left damper (76) are opened, and the first upper left damper (75) and the second lower left damper (78) are closed.

Room air flowing into the lower left flow path (64) through the room air suction port (53) flows into the space below the first adsorption heat exchanger (31) through the first lower left damper (77), and then upwardly passes through the first adsorption heat exchanger (31). In the first adsorption heat exchanger (31), moisture contained in the room air adsorbs to the adsorbent, and the room air is dehumidified. Adsorption heat generated thereupon is absorbed by refrigerant. The room air whose moisture is taken by the first adsorption heat exchanger (31) flows into the upper right flow path (61) through the first upper right damper (71), and then flows into the exhaust-side flow path (65). When passing through the second auxiliary heat exchanger (35), the room air flowing into the exhaust-side flow path (65) exchanges heat with refrigerant, i.e., dissipates heat to the refrigerant. Then, the room air is discharged to the outside through the air exhaust port (54).

When passing through the first auxiliary heat exchanger (34), outdoor air flowing into the lower right flow path (62) through the outdoor air suction port (51) exchanges heat with refrigerant, i.e., absorbs heat from the refrigerant, and the temperature of the outdoor air increases accordingly. The outdoor air whose temperature have increased flows into the space below the second adsorption heat exchanger (32) through the second lower right damper (74), and then upwardly passes through the second adsorption heat exchanger (32). In the second adsorption heat exchanger (32), moisture desorbs from the adsorbent heated with refrigerant, and is provided to the outdoor air. The outdoor air humidified in the second adsorption heat exchanger (32) flows into the upper left flow path (63) through the second upper left damper (76). After passing through the supply-side flow path (66), the outdoor air is supplied to the inside of the room through the air supply port (52).

According to the first embodiment, in the first mode of the humidification operation, the first adsorption heat exchanger (31) serves as a moisture-desorption adsorption heat exchanger functioning as a condenser. In the second mode of the humidification operation, the second adsorption heat exchanger (32) serves as the moisture-desorption adsorption heat exchanger serving as the condenser. Moreover, in both of the first and second modes of the humidification operation, the first auxiliary heat exchanger (34) serves as the condenser, and the second auxiliary heat exchanger (35) serves as the evaporator.

In the first mode of the humidification operation, the first auxiliary heat exchanger (34) serving as the condenser is, in the flow of outdoor air, positioned upstream of the first adsorption heat exchanger (31) serving as the moisture-desorption adsorption heat exchanger. In the second mode of the humidification operation, the first auxiliary heat exchanger (34) serving as the condenser is, in the flow of outdoor air, positioned upstream of the second adsorption heat exchanger (32) serving as the moisture-desorption adsorption heat exchanger. That is, in the humidification operation, the first auxiliary heat exchanger (34) serves as a preheat heat exchanger positioned upstream of the moisture-desorption adsorption heat exchanger in the flow of outdoor air in the air passage and functioning as the condenser to heat outdoor air. In the humidification operation, outdoor air pre-heated in the preheat heat exchanger is supplied to the moisture-desorption adsorption heat exchanger. Then, the outdoor air is humidified in the moisture-desorption adsorption heat exchanger, and then is supplied to the inside of the room.

Specifically, when passing through the preheat heat exchanger, outdoor air first exchanges heat with refrigerant, i.e., absorbs the heat from the refrigerant. Accordingly, the relative humidity of the outdoor air decreases. Then, the outdoor air passes through the moisture-desorption adsorption heat exchanger. At this point, in the moisture-desorption adsorption heat exchanger, moisture desorbs from the adsorbent heated with refrigerant, and then is provided to the outdoor air. The outdoor air passing through the moisture-desorption adsorption heat exchanger is, as described above, pre-heated in the preheat heat exchanger, and the relative humidity of the outdoor air decreases. This allows the outdoor air to easily capture the moisture desorbed from the adsorbent of the moisture-desorption adsorption heat exchanger, and therefore most of the desorbed moisture is contained in the outdoor air. The outdoor air to which sufficient moisture is provided in the moisture-desorption adsorption heat exchanger is supplied to the inside of the room, thereby sufficiently humidifying the inside of the room.

In the first mode of the humidification operation, the second auxiliary heat exchanger (35) serving as the evaporator is, in the flow of room air, positioned downstream of the second adsorption heat exchanger (32) serving as a moisture-absorption adsorption heat exchanger. On the other hand, in the second mode of the humidification operation, the second auxiliary heat exchanger (35) serving as the evaporator is, in the flow of room air, positioned downstream of the first adsorption heat exchanger (31) serving as the moisture-absorption adsorption heat exchanger. That is, in the humidification operation, the second auxiliary heat exchanger (35) serves as a heat-recovery heat exchanger positioned downstream of the moisture-absorption adsorption heat exchanger in the flow of room air in the air passage and functioning as the evaporator to recover heat from room air. In the humidification operation, room air dehumidified in the moisture-absorption adsorption heat exchanger is supplied to the heat-recovery heat exchanger. Heat of the room air is absorbed by refrigerant in the heat-recovery heat exchanger, and then the room air is discharged to the outside.

Specifically, room air first passes through the moisture-absorption adsorption heat exchanger. At this point, moisture contained in the room air adsorbs to the adsorbent, and therefore the room air is dehumidified. Then, adsorption heat generated thereupon is absorbed by refrigerant. When passing through the heat-recovery heat exchanger, the room air whose moisture is taken by the moisture-absorption adsorption heat exchanger exchanges heat with refrigerant, i.e., dissipates heat to the refrigerant. Then, the room air is discharged to the outside.

<Dehumidification Operation>

During the dehumidification operation, in the humidity control apparatus (10), the controller (100) operates the air supply fan (82) and the air exhaust fan (81). When the air supply fan (82) is operated, outdoor air is taken into the casing (50) through the outdoor air suction port (51). When the air exhaust fan (81) is operated, room air is taken into the casing (50) through the room air suction port (53). Moreover, during the dehumidification operation, the humidity control apparatus (10) alternately repeats first and second modes.

The first mode of the dehumidification operation will be described. In the first mode, recovery in the first adsorption heat exchanger (31) and adsorption in the second adsorption heat exchanger (32) are performed.

During the first mode, in the refrigerant circuit (15), the controller (100) sets, referring to FIG. 5(A), the four-way valve (17) to the first state. The opening degree of the electric expansion valve (36) is set to a predetermined minimum opening degree, and the opening degree of the electric expansion valve (33) is properly adjusted. In the refrigerant circuit (15), refrigerant discharged from the compressor (16) flows into the first adsorption heat exchanger (31), and then is condensed by dissipating heat to room air in the first adsorption heat exchanger (31). The condensed refrigerant flows into the electric expansion valve (33), and the pressure of the refrigerant is reduced in the electric expansion valve (33). The depressurized refrigerant flows into the second adsorption heat exchanger (32), and is evaporated by absorbing heat from outdoor air in the second adsorption heat exchanger (32). The evaporated refrigerant is sucked into the compressor (16), and then is compressed.

Since the electric expansion valve (36) is set to the predetermined minimum opening degree in the dehumidification operation, little of the refrigerant condensed in the first adsorption heat exchanger (31) flows into the auxiliary circuit (40), but only a slight amount of such condensed refrigerant flows into the auxiliary circuit (40).

Figure 6:
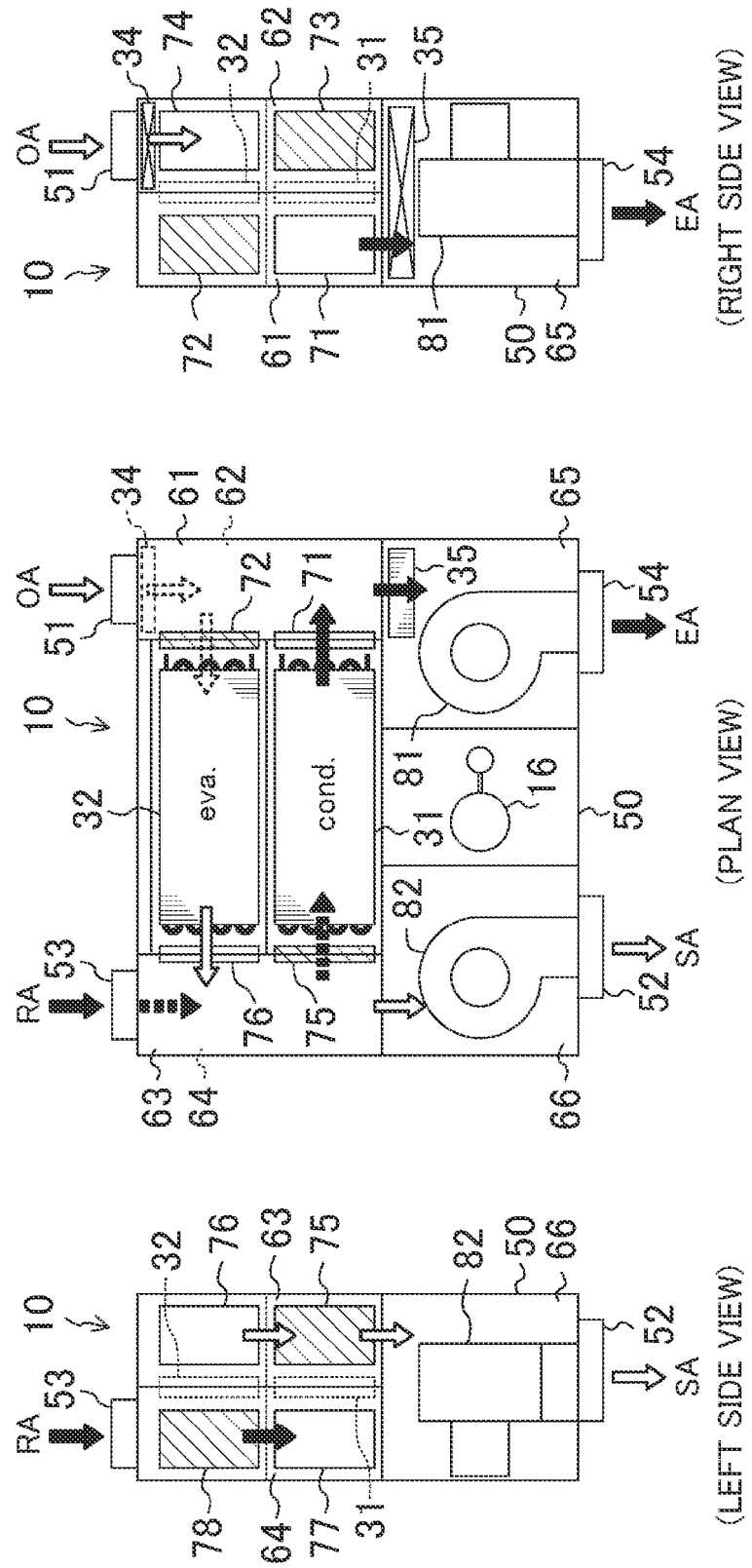
FIG. 6 is a schematic view illustrating the configuration of the humidity control apparatus in the first mode of the dehumidification operation in the first embodiment.

Referring to FIG. 6, in the first mode, the first upper right damper (71) and the second lower right damper (74) are opened, and the first lower right damper (73) and the second upper right damper (72) are closed. Moreover, the first lower left damper (77) and the second upper left damper (76) are opened, and the first upper left damper (75) and the second lower left damper (78) are closed.

After passing through the first auxiliary heat exchanger (34), outdoor air flowing into the lower right flow path (62) through the outdoor air suction port (51) flows into the space below the second adsorption heat exchanger (32) through the second lower right damper (74), and then upwardly passes through the second adsorption heat exchanger (32). In the second adsorption heat exchanger (32), moisture contained in the outdoor air adsorbs to the adsorbent, and the outdoor air is dehumidified. Adsorption heat generated thereupon is absorbed by refrigerant. The outdoor air dehumidified in the second adsorption heat exchanger (32) flows into the upper left flow path (63) through the second upper left damper (76). After passing through the supply-side flow path (66), the outdoor air is supplied to the inside of the room through the air supply port (52).

As described above, little refrigerant flows into the first auxiliary heat exchanger (34). Thus, when passing through the first auxiliary heat exchanger (34), the outdoor air exchanges little heat with the refrigerant.

Room air flowing into the lower left flow path (64) through the room air suction port (53) flows into the space below the first adsorption heat exchanger (31) through the first lower left damper (77), and then upwardly passes through the first adsorption heat exchanger (31). In the first adsorption heat exchanger (31), moisture desorbs from the adsorbent heated with refrigerant, and is provided to the room air. The moisture desorbed from the first adsorption heat exchanger (31) flows, together with the room air, into the upper right flow path (61) through the first upper right damper (71), and then flows into the exhaust-side flow path (65). After passing through the second auxiliary heat exchanger (35), the room air flowing into the exhaust-side flow path (65) is discharged to the outside through the air exhaust port (54).

As described above, little refrigerant flows into the second auxiliary heat exchanger (35). Thus, when passing through the second auxiliary heat exchanger (35), the room air exchanges little heat with the refrigerant.

The second mode of the dehumidification operation will be described. In the second mode, adsorption in the first adsorption heat exchanger (31) and recovery in the second adsorption heat exchanger (32) are performed.

During the second mode, in the refrigerant circuit (15), the controller (100) sets, referring to FIG. 5(B), the four-way valve (17) to the second state. The opening degree of the electric expansion valve (36) is set to a predetermined minimum opening degree, and the opening degree of the electric expansion valve (33) is properly adjusted. In the refrigerant circuit (15), refrigerant discharged from the compressor (16) flows into the second adsorption heat exchanger (32), and then is condensed by dissipating heat to room air in the second adsorption heat exchanger (32). The condensed refrigerant flows into the electric expansion valve (33), and the pressure of the refrigerant is reduced in the electric expansion valve (33). The depressurized refrigerant flows into the first adsorption heat exchanger (31), and is evaporated by absorbing heat from outdoor air in the first adsorption heat exchanger (31). The evaporated refrigerant is sucked into the compressor (16), and then is compressed.

Since the electric expansion valve (36) is set to the predetermined minimum opening degree in the dehumidification operation, little of the refrigerant condensed in the second adsorption heat exchanger (32) flows into the auxiliary circuit (40), but only a slight amount of such condensed refrigerant flows into the auxiliary circuit (40).

Figure 7:
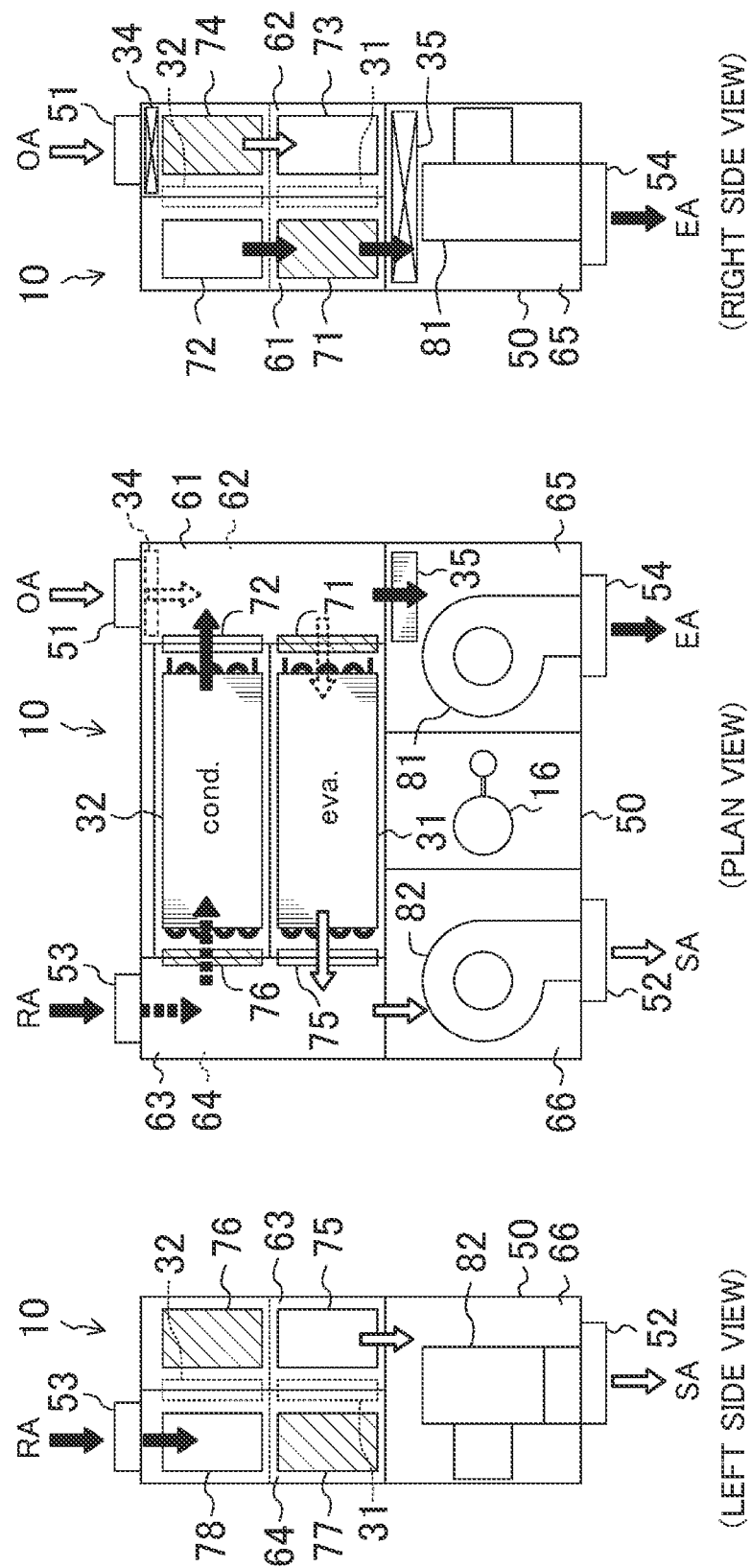
FIG. 7 is a schematic view illustrating the configuration of the humidity control apparatus in the second mode of the dehumidification operation in the first embodiment.

Referring to FIG. 7, in the second mode, the first lower right damper (73) and the second upper right damper (72) are opened, and the first upper right damper (71) and the second lower right damper (74) are closed. Moreover, the first upper left damper (75) and the second lower left damper (78) are opened, and the first lower left damper (77) and the second upper left damper (76) are closed.

After passing through the first auxiliary heat exchanger (34), outdoor air flowing into the lower right flow path (62) through the outdoor air suction port (51) flows into the space below the first adsorption heat exchanger (31) through the first lower right damper (73), and then upwardly passes through the first adsorption heat exchanger (31). In the first adsorption heat exchanger (31), moisture contained in the outdoor air adsorbs to the adsorbent, and the outdoor air is dehumidified. Adsorption heat generated thereupon is absorbed by refrigerant. The outdoor air dehumidified in the first adsorption heat exchanger (31) flows into the upper left flow path (63) through the first upper left damper (75). After passing through the supply-side flow path (66), the outdoor air is supplied to the inside of the room through the air supply port (52).

As described above, little refrigerant flows into the first auxiliary heat exchanger (34). Thus, when passing through the first auxiliary heat exchanger (34), the outdoor air exchanges little heat with the refrigerant.

Room air flowing into the lower left flow path (64) through the room air suction port (53) flows into the space below the second adsorption heat exchanger (32) through the second lower left damper (78), and then upwardly passes through the second adsorption heat exchanger (32). In the second adsorption heat exchanger (32), moisture desorbs from the adsorbent heated with refrigerant, and is provided to the room air. The moisture desorbed from the second adsorption heat exchanger (32) flows, together with the room air, into the upper right flow path (61) through the second upper right damper (72), and then flows into the exhaust-side flow path (65). After passing through the second auxiliary heat exchanger (35), the room air flowing into the exhaust-side flow path (65) is discharged to the outside through the air exhaust port (54).

As described above, little refrigerant flows into the second auxiliary heat exchanger (35). Thus, when passing through the second auxiliary heat exchanger (35), the room air exchanges little heat with the refrigerant.

Advantages of First Embodiment

According to the humidity control apparatus (10), during the humidification operation, after outdoor air is heated with refrigerant in the first auxiliary heat exchanger (34) serving as the preheat heat exchanger, the outdoor air passes through one of the first and second adsorption heat exchangers (31, 32) serving as the moisture-desorption adsorption heat exchanger in the humidity control apparatus (10). Thus, even under a low outdoor temperature, most of moisture desorbed from the adsorbent of the moisture-desorption adsorption heat exchanger can be captured by the outdoor air. Consequently, the inside of the room can be sufficiently humidified. Moreover, during the humidification operation, after room air is dehumidified in one of the first and second adsorption heat exchangers (31, 32) serving as the moisture-absorption adsorption heat exchanger, the room air passes through the second auxiliary heat exchanger (35) serving as the heat-recovery heat exchanger in the humidity control apparatus (10). Thus, condensation of moisture contained in the room air does not occur in the second auxiliary heat exchanger (35). In addition, a sufficient amount of the moisture contained in the room air can be recovered in the moisture-absorption adsorption heat exchanger, and sufficient heat can be recovered from the room air by refrigerant. According to such a configuration, even under a low outdoor temperature, the inside of the room can be sufficiently humidified.

The humidification operation is often combined with an air-heating operation during the winter. When the humidification operation is performed under an extremely low outdoor temperature, there is a possibility that the temperature of humidified outdoor air to be supplied to the inside of the room reaches lower than a room temperature, resulting in an increase in air-heating load inside the room.

However, in the humidity control apparatus (10), outdoor air can be heated to a certain level in the first auxiliary heat exchanger (34) serving as the preheat heat exchanger. Moreover, in the humidity control apparatus (10), refrigerant recovers heat from room air not only in the moisture-absorption adsorption heat exchanger but also in the second auxiliary heat exchanger (35) serving as the heat-recovery heat exchanger. Thus, the amount of heat dissipated from refrigerant increases in the moisture-desorption adsorption heat exchanger and the first auxiliary heat exchanger (34). According to the humidity control apparatus (10), even in the humidification operation under a low outdoor temperature, a sufficient amount of heat dissipated from refrigerant to outdoor air can be ensured, and therefore an increase in air-heating load inside the room can be reduced.

In the humidity control apparatus (10), the refrigerant circuit is provided with the auxiliary circuit (40) in which the first auxiliary heat exchanger (34) serving as the preheat heat exchanger, the electric expansion valve (36), and the second auxiliary heat exchanger (35) serving as the heat-recovery heat exchanger are connected together in series in this order. As a result, in the case where pre-heating of outdoor air and recovery of heat from room air to refrigerant are not required, the electric expansion valve (36) of the auxiliary circuit (40) is closed or is fastened to the minimum opening degree, thereby reducing or preventing unnecessary pressure loss in the first auxiliary heat exchanger (34) and the second auxiliary heat exchanger (35). Accordingly, lowering of refrigeration cycle efficiency can be reduced.

In the humidity control apparatus (10), the first auxiliary heat exchanger (34) serving as the preheat heat exchanger, the electric expansion valve (36), and the second auxiliary heat exchanger (35) serving as the heat-recovery heat exchanger are provided in the one-way passage (41) of the auxiliary circuit (40). Thus, even if the refrigerant circulation direction in the refrigerant circuit (15) is reversed, refrigerant flows in one direction in the one-way passage (41). This brings about, without switching of the first auxiliary heat exchanger (34) and the second auxiliary heat exchanger (35) between the preheat heat exchanger and the heat-recovery heat exchanger, the state in which the first auxiliary heat exchanger (34) constantly serves as the preheat heat exchanger and the second auxiliary heat exchanger (35) constantly serves as the heat-recovery heat exchanger. If the first auxiliary heat exchanger (34) and the second auxiliary heat exchanger (35) switch between the preheat heat exchanger and the heat-recovery heat exchanger depending on reverse of the refrigerant circulation direction in the refrigerant circuit (15), thermal capacity loss occurs after switching. However, the foregoing configuration can reduce or prevent occurrence of such thermal capacity loss.

According to the humidity control apparatus (10), since the auxiliary circuit (40) including the one-way passage (41) through which refrigerant flows in one direction even if the refrigerant circulation direction in the refrigerant circuit (15) is reversed is the bridge circuit, the auxiliary circuit (40) can be easily formed.

According to the humidity control apparatus (10), in the dehumidification operation, the electric expansion valve (36) of the auxiliary circuit (40) is opened to the predetermined minimum opening degree to ensure the flow of a slight amount of refrigerant in the auxiliary circuit (40). Thus, accumulation of refrigerant in the first auxiliary heat exchanger (34) can be reduced. Consequently, lowering of refrigeration cycle efficiency due to a decrease in amount of refrigerant circulating in the refrigerant circuit (15) can be reduced.

<<Second Embodiment of the Invention>>

A humidity control apparatus (10) of a second embodiment is different from that of the first embodiment in the circuit configuration of the humidity control apparatus (10).

Referring to FIGS. 8(A) and 8(B), in the humidity control apparatus (10) of the second embodiment, a bypass passage (42) connecting between discharge and suction sides of a compressor (16) forms an auxiliary circuit (40). Specifically, the bypass passage (42) is, at one end thereof, connected to the middle of a discharge pipe connecting between the discharge side of the compressor (16) and a first port of a four-way valve (17), and is, at the other end thereof, connected to the middle of a suction pipe connecting between the suction side of the compressor (16) and a second port of the four-way valve (17). A first auxiliary heat exchanger (34), an electric expansion valve (36), and a second auxiliary heat exchanger (35) are connected together in series in this order from the discharge side to the suction side of the compressor (16) in the bypass passage (42).

Since the bypass passage (42) is connected to the discharge and suction pipes of the compressor (16) as just described, the bypass passage (42) forms a one-way flow path through which refrigerant flows in one direction even if the four-way valve (17) switches to change a refrigerant circulation direction in a refrigerant circuit (15). Thus, in the present embodiment, regardless of the refrigerant circulation direction in the refrigerant circuit (15), the first auxiliary heat exchanger (34) constantly serves as a condenser, and the second auxiliary heat exchanger (35) constantly serves as an evaporator.

Referring to FIG. 8(A), in a first mode of a humidification operation, a controller (100) sets the four-way valve (17) to a first state, and the opening degree of an electric expansion valve (33) of the refrigerant circuit (15) and the opening degree of the electric expansion valve (36) of the auxiliary circuit (40) are properly adjusted.

In the refrigerant circuit (15), part of refrigerant discharged from the compressor (16) flows into the bypass passage (42) of the auxiliary circuit (40) connected to the discharge pipe of the compressor (16), and the remaining part of the refrigerant flows toward a first adsorption heat exchanger (31) through the four-way valve (17). In the bypass passage (42), the refrigerant passes through the first auxiliary heat exchanger (34), the electric expansion valve (36), and the second auxiliary heat exchanger (35) in this order. The pressure of the refrigerant condensed by dissipating heat to outdoor air in the first auxiliary heat exchanger (34) is reduced in the electric expansion valve (36), and then such refrigerant is evaporated by absorbing heat from room air in the second auxiliary heat exchanger (35). The evaporated refrigerant flows into the suction pipe of the compressor (16) of the refrigerant circuit (15). Meanwhile, in the refrigerant circuit (15), the refrigerant passes through the first adsorption heat exchanger (31), the electric expansion valve (33), and a second adsorption heat exchanger (32) in this order. The pressure of the refrigerant condensed by dissipating heat to outdoor air in the first adsorption heat exchanger (31) is reduced in the electric expansion valve (33), and then such refrigerant is evaporated by absorbing heat from room air in the second adsorption heat exchanger (32). At the suction pipe of the compressor (16), the evaporated refrigerant joins the refrigerant flowing out from the bypass passage (42). Then, the refrigerant is sucked into the compressor (16), and then is compressed.

While refrigerant flows through the refrigerant circuit (15) and the auxiliary circuit (40) as just described, room air taken from the inside of a room is discharged to the outside after passing through the second adsorption heat exchanger (32) and the second auxiliary heat exchanger (35) in this order. Moisture contained in the room air adsorbs to an adsorbent in the second adsorption heat exchanger (32), and therefore the room air is dehumidified. Adsorption heat generated thereupon is absorbed by refrigerant. Heat of the room air dehumidified in the second adsorption heat exchanger (32) is absorbed by refrigerant when the room air passes through the second auxiliary heat exchanger (35). Then, the room air is discharged to the outside. Meanwhile, outdoor air taken from the outside is supplied to the inside of the room after passing through the first auxiliary heat exchanger (34) and the first adsorption heat exchanger (31) in this order. The outdoor air is heated with refrigerant when passing through the first auxiliary heat exchanger (34). Then, moisture desorbed from an adsorbent heated with refrigerant is provided to the outdoor air in the first adsorption heat exchanger (31), thereby humidifying the outdoor air. Subsequently, the outdoor air is supplied to the inside of the room.

Referring to FIG. 8(B), in a second mode of the humidification operation, the controller (100) sets the four-way valve (17) to a second state, and the opening degree of the electric expansion valve (33) of the refrigerant circuit (15) and the opening degree of the electric expansion valve (36) of the auxiliary circuit (40) are properly adjusted.

In the refrigerant circuit (15), part of refrigerant discharged from the compressor (16) flows into the bypass passage (42) of the auxiliary circuit (40) connected to the discharge pipe of the compressor (16), and the remaining part of the refrigerant flows toward the second adsorption heat exchanger (32) through the four-way valve (17). In the bypass passage (42), the refrigerant passes through the first auxiliary heat exchanger (34), the electric expansion valve (36), and the second auxiliary heat exchanger (35) in this order. The pressure of the refrigerant condensed by dissipating heat to outdoor air in the first auxiliary heat exchanger (34) is reduced in the electric expansion valve (36), and then such refrigerant is evaporated by absorbing heat from room air in the second auxiliary heat exchanger (35). The evaporated refrigerant flows into the suction pipe of the compressor (16) of the refrigerant circuit (15). Meanwhile, in the refrigerant circuit (15), the refrigerant passes through the second adsorption heat exchanger (32), the electric expansion valve (33), and the first adsorption heat exchanger (31) in this order. The pressure of the refrigerant condensed by dissipating heat to outdoor air in the second adsorption heat exchanger (32) is reduced in the electric expansion valve (33), and then such refrigerant is evaporated by absorbing heat from room air in the first adsorption heat exchanger (31). At the suction pipe of the compressor (16), the evaporated refrigerant joins the refrigerant flowing out from the bypass passage (42). Then, the refrigerant is sucked into the compressor (16), and then is compressed.

While refrigerant flows through the refrigerant circuit (15) and the auxiliary circuit (40) as just described, room air taken from the inside of the room is discharged to the outside after passing through the first adsorption heat exchanger (31) and the second auxiliary heat exchanger (35) in this order. Moisture contained in the room air adsorbs to the adsorbent in the first adsorption heat exchanger (31), and therefore the room air is dehumidified. Adsorption heat generated thereupon is absorbed by refrigerant. Heat of the room air dehumidified in the first adsorption heat exchanger (31) is absorbed by refrigerant when the room air passes through the second auxiliary heat exchanger (35). Then, the room air is discharged to the outside. Meanwhile, outdoor air taken from the outside is supplied to the inside of the room after passing through the first auxiliary heat exchanger (34) and the second adsorption heat exchanger (32) in this order. The outdoor air is heated with refrigerant when passing through the first auxiliary heat exchanger (34). Then, moisture desorbed from the adsorbent heated with refrigerant is provided to the outdoor air in the second adsorption heat exchanger (32), thereby humidifying the outdoor air. Subsequently, the outdoor air is supplied to the inside of the room.

Operation of the humidity control apparatus (10) in a dehumidification operation is similar to that in the humidification operation, except that the electric expansion valve (36) is set to a predetermined minimum opening degree to cause only a slight amount of refrigerant to flow into the auxiliary circuit (40) and that an air flow is reversed between first and second modes to supply dehumidified outdoor air to the inside of the room and to discharge humidified room air to the outside.

As just described, in the present embodiment, the first adsorption heat exchanger (31) serves as a moisture-desorption adsorption heat exchanger functioning as a condenser in the first mode of the humidification operation, and the second adsorption heat exchanger (32) serves as the moisture-desorption adsorption heat exchanger functioning as the condenser in the second mode of the humidification operation. Moreover, in both of the first and second modes of the humidification operation, the first auxiliary heat exchanger (34) serves as a condenser, and the second auxiliary heat exchanger (35) serves as an evaporator.

In the first mode of the humidification operation, the first auxiliary heat exchanger (34) serving as the condenser is, in the flow of outdoor air, positioned upstream of the first adsorption heat exchanger (31) serving as the moisture-desorption adsorption heat exchanger. On the other hand, in the second mode of the humidification operation, the first auxiliary heat exchanger (34) serving as the condenser is, in the flow of outdoor air, positioned upstream of the second adsorption heat exchanger (32) serving as the moisture-desorption adsorption heat exchanger. That is, in the humidification operation, the first auxiliary heat exchanger (34) serves as a preheat heat exchanger positioned upstream of the moisture-desorption adsorption heat exchanger in the flow of outdoor air in an air passage and functioning as the condenser to heat outdoor air. As a result, outdoor air pre-heated in the first auxiliary heat exchanger (34) is supplied to the moisture-desorption adsorption heat exchanger. The outdoor air is humidified in the moisture-desorption adsorption heat exchanger, and then is supplied to the inside of the room.

In the first mode of the humidification operation, the second auxiliary heat exchanger (35) serving as the evaporator is, in the flow of room air, positioned downstream of the second adsorption heat exchanger (32) serving as a moisture-absorption adsorption heat exchanger. On the other hand, in the second mode of the humidification operation, the second auxiliary heat exchanger (35) serving as the evaporator is, in the flow of room air, positioned downstream of the first adsorption heat exchanger (31) serving as the moisture-absorption adsorption heat exchanger. That is, the second auxiliary heat exchanger (35) serves as a heat-recovery heat exchanger positioned downstream of the moisture-absorption adsorption heat exchanger in the flow of room air in the air passage and functioning as the evaporator to recover heat from room air. As a result, room air dehumidified in the moisture-absorption adsorption heat exchanger is supplied to the second auxiliary heat exchanger (35). Heat of the room air is absorbed by refrigerant in the second auxiliary heat exchanger (35), and then the room air is discharged to the outside.

As described above, advantages similar to those of the first embodiment can be also realized in the second embodiment.

<<Third Embodiment of the Invention>>

A humidity control apparatus (10) of a third embodiment is different from that of the first embodiment in a circuit configuration and an air passage of the humidity control apparatus (10).

Referring to FIGS. 9(A) and 9(B), the humidity control apparatus (10) of the third embodiment is configured such that a bypass passage (43) connecting between gas pipes connected respectively to the first and second adsorption heat exchangers (31, 32) forms an auxiliary circuit (40). Specifically, the bypass passage (43) is, at one end thereof, connected to the middle of the gas pipe connecting between the first adsorption heat exchanger (31) and a third port of a four-way valve (17), and is, at the other end thereof, connected to the middle of the gas pipe connecting between the second adsorption heat exchanger (32) and a fourth port of the four-way valve (17). In the bypass passage (43), a first auxiliary heat exchanger (34), an electric expansion valve (36), and a second auxiliary heat exchanger (35) are connected together in series in this order from the third port to the fourth port of the four-way valve (17).

In the present embodiment, a refrigerant circulation direction in the bypass passage (43) is reversed depending on a refrigerant circulation direction in a refrigerant circuit (15). Thus, in the present embodiment, when the four-way valve (17) is in a first state, the first auxiliary heat exchanger (34) serves as a condenser, and the second auxiliary heat exchanger (35) serves as an evaporator. On the other hand, when the four-way valve (17) is in a second state, the second auxiliary heat exchanger (35) serves as a condenser, and the first auxiliary heat exchanger (34) serves as an evaporator.

Referring to FIG. 9(A), in a first mode of a humidification operation, a controller (100) sets the four-way valve (17) to the first state, and the opening degree of an electric expansion valve (33) of the refrigerant circuit (15) and the opening degree of the electric expansion valve (36) of the auxiliary circuit (40) are properly adjusted.

In the refrigerant circuit (15), refrigerant discharged from a compressor (16) flows toward the first adsorption heat exchanger (31) through the four-way valve (17). Part of the refrigerant flows into the bypass passage (43) of the auxiliary circuit (40), and the remaining part of the refrigerant flows into the first adsorption heat exchanger (31). In the bypass passage (43), the refrigerant passes through the first auxiliary heat exchanger (34), the electric expansion valve (36), and the second auxiliary heat exchanger (35) in this order. The pressure of the refrigerant condensed by dissipating heat to outdoor air in the first auxiliary heat exchanger (34) is reduced in the electric expansion valve (36), and then the refrigerant is evaporated by absorbing heat from room air in the second auxiliary heat exchanger (35). The evaporated refrigerant flows into the gas pipe connected to the second adsorption heat exchanger (32) of the refrigerant circuit (15). Meanwhile, in the refrigerant circuit (15), the refrigerant passes through the first adsorption heat exchanger (31), the electric expansion valve (33), and the second adsorption heat exchanger (32) in this order. The pressure of the refrigerant condensed by dissipating heat to outdoor air in the first adsorption heat exchanger (31) is reduced in the electric expansion valve (33), and then the refrigerant is evaporated by absorbing heat from room air in the second adsorption heat exchanger (32). The evaporated refrigerant joins the refrigerant flowing out from the bypass passage (43). The refrigerant is sucked into the compressor (16), and then is compressed.

In the third embodiment, the air passage is formed such that air flows as follows when refrigerant flows in the refrigerant circuit (15) and the auxiliary circuit (40) as described above.

After passing through the second adsorption heat exchanger (32) and the second auxiliary heat exchanger (35) in this order, room air taken from the inside of a room is discharged to the outside. Moisture contained in the room air adsorbs to an adsorbent in the second adsorption heat exchanger (32), and therefore the room air is dehumidified. Adsorption heat generated thereupon is absorbed by refrigerant. When passing through the second auxiliary heat exchanger (35), heat of the room air dehumidified in the second adsorption heat exchanger (32) is absorbed by refrigerant, and then the room air is discharged to the outside. Meanwhile, after passing through the first auxiliary heat exchanger (34) and the first adsorption heat exchanger (31) in this order, outdoor air taken from the outside is supplied to the inside of the room. When passing through the first auxiliary heat exchanger (34), the outdoor air is heated with refrigerant. Then, moisture desorbed from an adsorbent heated with refrigerant is provided to the outdoor air in the first adsorption heat exchanger (31), and therefore the outdoor air is humidified. Subsequently, the outdoor air is supplied to the inside of the room.

Referring to FIG. 9(B), in a second mode of the humidification operation, the controller (100) sets the four-way valve (17) to the second state, and the opening degree of the electric expansion valve (33) of the refrigerant circuit (15) and the opening degree of the electric expansion valve (36) of the auxiliary circuit (40) are properly adjusted.

In the refrigerant circuit (15), refrigerant discharged from the compressor (16) flows toward the second adsorption heat exchanger (32) through the four-way valve (17). Part of the refrigerant flows into the bypass passage (43) of the auxiliary circuit (40), and the remaining part of the refrigerant flows into the second adsorption heat exchanger (32). In the bypass passage (43), the refrigerant passes through the second auxiliary heat exchanger (35), the electric expansion valve (36), and the first auxiliary heat exchanger (34) in this order. The pressure of the refrigerant condensed by dissipating heat to outdoor air in the second auxiliary heat exchanger (35) is reduced in the electric expansion valve (36), and then the refrigerant is evaporated by absorbing heat from room air in the first auxiliary heat exchanger (34). The evaporated refrigerant flows into the gas pipe connected to the first adsorption heat exchanger (31) of the refrigerant circuit (15). Meanwhile, in the refrigerant circuit (15), the refrigerant passes through the second adsorption heat exchanger (32), the electric expansion valve (33), and the first adsorption heat exchanger (31) in this order. The pressure of the refrigerant condensed by dissipating heat to outdoor air in the second adsorption heat exchanger (32) is reduced in the electric expansion valve (33), and then the refrigerant is evaporated by absorbing heat from room air in the first adsorption heat exchanger (31). The evaporated refrigerant joins the refrigerant flowing out from the bypass passage (43). The refrigerant is sucked into the compressor (16), and then is compressed.

The air passage of the third embodiment is formed such that air flows as follows when refrigerant flows in the refrigerant circuit (15) and the auxiliary circuit (40) as described above.

After passing through the first adsorption heat exchanger (31) and the first auxiliary heat exchanger (34) in this order, room air taken from the inside of the room is discharged to the outside. Moisture contained in the room air adsorbs to the adsorbent in the first adsorption heat exchanger (31), and therefore the room air is dehumidified. Adsorption heat generated thereupon is absorbed by refrigerant. When passing through the first auxiliary heat exchanger (34), heat of the room air dehumidified in the first adsorption heat exchanger (31) is absorbed by refrigerant, and then the room air is discharged to the outside. Meanwhile, after passing through the second auxiliary heat exchanger (35) and the second adsorption heat exchanger (32) in this order, outdoor air taken from the outside is supplied to the inside of the room. When passing through the second auxiliary heat exchanger (35), the outdoor air is heated with refrigerant. Then, moisture desorbed from the adsorbent heated with refrigerant is provided to the outdoor air in the second adsorption heat exchanger (32), and therefore the outdoor air is humidified. Subsequently, the outdoor air is supplied to the inside of the room.

Operation of the humidity control apparatus (10) in a dehumidification operation is similar to that in the humidification operation, except that the electric expansion valve (36) is set to a predetermined minimum opening degree to cause only a slight amount of refrigerant to flow into the auxiliary circuit (40) and that an air flow is reversed between first and second modes to supply dehumidified outdoor air to the inside of the room and to discharge humidified room air to the outside.

As just described, in the present embodiment, the first adsorption heat exchanger (31) serves as a moisture-desorption adsorption heat exchanger functioning as a condenser in the first mode of the humidification operation, and the second adsorption heat exchanger (32) serves as the moisture-desorption adsorption heat exchanger functioning as the condenser in the second mode of the humidification operation. Moreover, according to the present embodiment, in the first mode of the humidification operation, the first auxiliary heat exchanger (34) serves as a condenser, and the second auxiliary heat exchanger (35) serves as an evaporator. On the other hand, in the second mode of the humidification operation, the second auxiliary heat exchanger (35) serves as a condenser, and the first auxiliary heat exchanger (34) serves as an evaporator.

In the first mode of the humidification operation, the first auxiliary heat exchanger (34) serving as the condenser is, in the flow of outdoor air, positioned upstream of the first adsorption heat exchanger (31) serving as the moisture-desorption adsorption heat exchanger. On the other hand, in the second mode of the humidification operation, the second auxiliary heat exchanger (35) serving as the condenser is, in the flow of outdoor air, positioned upstream of the second adsorption heat exchanger (32) serving as the moisture-desorption adsorption heat exchanger. That is, the first auxiliary heat exchanger (34) serves as a preheat heat exchanger in the first mode of the humidification operation, and the second auxiliary heat exchanger (35) serves as the preheat heat exchanger in the second mode of the humidification operation. According to the present embodiment, in the humidification operation, outdoor air pre-heated in the preheat heat exchanger is supplied to the moisture-desorption adsorption heat exchanger, and is humidified in the moisture-desorption adsorption heat exchanger. Then, the outdoor air is supplied to the inside of the room.

In the first mode of the humidification operation, the second auxiliary heat exchanger (35) serving as the evaporator is, in the flow of room air, positioned downstream of the second adsorption heat exchanger (32) serving as a moisture-absorption adsorption heat exchanger. On the other hand, in the second mode of the humidification operation, the first auxiliary heat exchanger (34) serving as the evaporator is, in the flow of room air, positioned downstream of the first adsorption heat exchanger (31) serving as the moisture-absorption adsorption heat exchanger. That is, the second auxiliary heat exchanger (35) serves as a heat-recovery heat exchanger in the first mode of the humidification operation, and the first auxiliary heat exchanger (34) serves as the heat-recovery heat exchanger in the second mode of the humidification operation. In the present embodiment, room air dehumidified in the moisture-absorption adsorption heat exchanger is supplied to the heat-recovery heat exchanger, and heat of the room air is absorbed by refrigerant in the heat-recovery heat exchanger. Then, the room air is discharged to the outside.

As described above, advantages similar to those of the first embodiment can be also realized in the third embodiment.

<<Other Embodiment>>

The foregoing embodiments may have the following configurations.

In each of the foregoing embodiments, not only silica gel, zeolite, etc. capable of mainly adsorbing moisture but also materials capable of adsorbing and absorbing moisture may be used as the adsorbent. Specifically, e.g., an organic polymeric material having moisture absorbency may be used as the adsorbent. In the organic polymeric material used as the adsorbent, a plurality of polymer main chains having hydrophilic groups in molecules are cross-linked to each other, and the polymer main chains cross-liked to each other form a three-dimensional structure. Such an adsorbent captures moisture (i.e., absorbs moisture), and is swollen accordingly. The mechanism for swelling the adsorbent by moisture absorption is assumed as follows. That is, when the adsorbent absorbs moisture, the moisture adsorbs to each hydrophilic group, and electric force generated by reaction among the hydrophilic groups and the moisture acts on the polymer main chains. As a result, the polymer main chains are deformed. The moisture is taken into a clearance among the deformed polymer chains due to capillary force, and therefore the three-dimensional structure formed of the polymer main chains is swollen. Consequently, the volume of the adsorbent increases.

In the foregoing adsorbent, both of adsorption of moisture to the adsorbent and absorption of moisture by the adsorbent occur. That is, moisture sorbs to the adsorbent. Moisture captured by the adsorbent not only adheres to a surface of the three-dimensional structure formed of the polymer main chains cross-linked to each other, but also enters the inside of the three-dimensional structure. As a result, the adsorbent captures a larger amount of moisture as compared to, e.g., zeolite capable of only adsorbing moisture to a surface thereof.

The foregoing adsorbent releases moisture (i.e., desorbs moisture), and is contracted accordingly. That is, when the adsorbent desorbs moisture, the amount of moisture captured among the polymer main chains decreases, and the shape of the three-dimensional structure formed of the polymer main chains returns to an original shape. Thus, the volume of the adsorbent decreases.

As long as the adsorbent is swollen by absorbing moisture and is contracted by desorbing moisture, the material used as the adsorbent is not limited to the foregoing materials. For example, ion-exchange resin having moisture absorbency may be used.

The foregoing embodiments have been set forth merely for the purpose of preferred examples in nature, and are not intended to limit the scope, applications, and use of the invention.

INDUSTRIAL APPLICABILITY

As described above, the present disclosure is useful for the humidity control apparatus configured to control the room humidity using the adsorbent.

DESCRIPTION OF REFERENCE CHARACTERS

10 Humidity Control Apparatus
15 Refrigerant Circuit
16 Compressor
31 First Adsorption Heat Exchanger (Adsorption Heat Exchanger)
32 Second Adsorption Heat Exchanger (Adsorption Heat Exchanger)
33 Electric Expansion Valve (Expansion Mechanism)
34 First Auxiliary Heat Exchanger (Preheat Heat Exchanger, Heat-Recovery Heat Exchanger)
35 Second Auxiliary Heat Exchanger (Heat-recovery Heat Exchanger, Preheat Heat Exchanger)
40 Auxiliary Heat Exchanger 41 One-Way Passage (One-Way Flow Path)
42 Bypass Passage (One-Way Flow Path)
100 Controller (Control Section)

The invention claimed is:

1. A humidity control apparatus including
a refrigerant circuit configured such that
  a compressor, an expansion mechanism, and two adsorption heat exchangers on each of which an adsorbent is supported are connected together through a pipe,
  a refrigerant circulation direction is reversible, and
  a vapor compression refrigeration cycle is performed, and
an air passage configured such that an air flow path switches, depending on the refrigerant circulation direction in the refrigerant circuit, so as to
  cause one of room air or outdoor air taken into the air passage to pass through one of the adsorption heat exchangers serving as a moisture-desorption adsorption heat exchanger functioning as a condenser and
  cause an other one of the room air or the outdoor air to pass through an other one of the adsorption heat exchangers serving as a moisture-absorption adsorption heat exchanger functioning as an evaporator,
in which a humidification operation is performed, in which
  the outdoor air is supplied to an inside of a room through the moisture-desorption adsorption heat exchanger, and
  the room air is discharged to an outside through the moisture-absorption adsorption heat exchanger, the humidity control apparatus comprising:
a preheat heat exchanger
  connected to the refrigerant circuit and
  in the humidification operation, positioned upstream of the moisture-desorption adsorption heat exchanger in a flow of the outdoor air in the air passage and serving as a condenser to heat the outdoor air; and
a heat-recovery heat exchanger
  connected to the refrigerant circuit and
  in the humidification operation, positioned downstream of the moisture-absorption adsorption heat exchanger in a flow of the room air in the air passage and serving as an evaporator to recover heat from the room air.

2. The humidity control apparatus of claim 1, wherein
in the refrigerant circuit, an auxiliary circuit is provided, in which the preheat heat exchanger, an expansion valve, and the heat-recovery heat exchanger are connected together in series in this order.

3. The humidity control apparatus of claim 2, wherein
the auxiliary circuit includes a one-way flow path through which refrigerant flows in one direction even if the refrigerant circulation direction in the refrigerant circuit is reversed, and
the preheat heat exchanger, the expansion valve, and the heat-recovery heat exchanger are provided in the one-way flow path.

4. The humidity control apparatus of claim 3, wherein
the auxiliary circuit is a bridge circuit including the one-way flow path.

5. The humidity control apparatus of claim 4, wherein
a dehumidification operation is performed, in which
  the outdoor air is supplied to the inside of the room through the moisture-absorption adsorption heat exchanger, and
  the room air is discharged to the outside through the moisture-desorption adsorption heat exchanger, and
  a control section is provided, which is configured to open the expansion valve to a predetermined minimum opening degree in the dehumidification operation.

* * * * *